US010517219B2

(12) United States Patent
Jones

(10) Patent No.: US 10,517,219 B2
(45) Date of Patent: Dec. 31, 2019

(54) MECHANICAL LINKAGE FOR AGRICULTURAL ACCUMULATOR INCLUDING EXTENDABLE CARRIAGES

(71) Applicant: Deere & Company, Moline, IL (US)

(72) Inventor: Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 298 days.

(21) Appl. No.: 15/427,977

(22) Filed: Feb. 8, 2017

(65) Prior Publication Data

US 2017/0290266 A1 Oct. 12, 2017

Related U.S. Application Data

(60) Provisional application No. 62/320,173, filed on Apr. 8, 2016.

(51) Int. Cl.
*A01D 85/00* (2006.01)
*A01D 90/08* (2006.01)

(52) U.S. Cl.
CPC .......... *A01D 85/005* (2013.01); *A01D 90/08* (2013.01); *A01D 2085/007* (2013.01); *A01D 2085/008* (2013.01)

(58) Field of Classification Search
CPC .............. A01F 15/0765; A01F 15/0875; A01F 15/007; A01F 15/008; A01F 15/005; A01F 15/0083
See application file for complete search history.

(56) References Cited

U.S. PATENT DOCUMENTS

| 3,163,302 A | 12/1964 | Pridgeon |
| 4,310,275 A | 1/1982 | Hoelscher |
| 4,844,675 A | 7/1989 | Strosser et al. |
| 4,955,774 A | 9/1990 | Van Eecke et al. |

(Continued)

FOREIGN PATENT DOCUMENTS

| AU | 568143 | 12/1987 |
| AU | 2003262343 | 6/2005 |

(Continued)

OTHER PUBLICATIONS

EP17164310.9 Extended European Search Report dated Sep. 15, 2017 (6 pages).

*Primary Examiner* — Kaitlin S Joerger
(74) *Attorney, Agent, or Firm* — Michael Best & Friedrich LLP

(57) ABSTRACT

An accumulator is coupled to an agricultural baler and is configured to support a crop package exiting the baler. The accumulator includes a frame having a first end, a second end, and a support surface positioned between the first and the second ends. The support surface is configured to support the crop package that exits the baler. The accumulator also includes a carriage coupled to the first end of the frame and linearly moveable relative to the frame between a retracted position and an extended position. The carriage is configured to support the crop package when in the extended position. The accumulator further includes a linkage coupled to at least one of the frame and the carriage. The linkage is configured to move the carriage to at least one of the extended and retracted positions.

21 Claims, 26 Drawing Sheets

(56) References Cited

U.S. PATENT DOCUMENTS

| | | | | |
|---|---|---|---|---|
| 5,180,271 | A * | 1/1993 | Farden | A01D 90/083 |
| | | | | 298/18 |
| 5,842,823 | A | 12/1998 | Kohnen et al. | |
| 6,053,685 | A | 4/2000 | Tomchak | |
| 6,425,235 | B1 * | 7/2002 | Spaniol | A01D 85/005 |
| | | | | 56/474 |
| 6,537,008 | B1 * | 3/2003 | Haring | A01D 90/083 |
| | | | | 298/18 |
| 6,607,342 | B1 * | 8/2003 | Tolzin | A01D 90/08 |
| | | | | 414/111 |
| 7,000,533 | B2 | 2/2006 | Derscheid et al. | |
| 7,401,547 | B2 | 7/2008 | Degen | |
| 8,152,429 | B2 * | 4/2012 | Rennie | A01D 85/005 |
| | | | | 414/111 |
| 8,567,169 | B2 * | 10/2013 | Spaniol | A01D 85/005 |
| | | | | 414/111 |
| 9,578,811 | B2 * | 2/2017 | Kraus | A01F 15/0765 |
| 9,622,420 | B2 * | 4/2017 | Kraus | A01F 15/0883 |
| 9,877,433 | B2 * | 1/2018 | Kraus | A01F 15/0883 |
| 9,995,319 | B2 * | 6/2018 | Jones | A01F 15/07 |
| 10,123,488 | B2 * | 11/2018 | Kraus | A01F 15/0765 |
| 10,212,886 | B2 * | 2/2019 | O'Brien | A01D 85/005 |
| 2006/0086263 | A1 | 4/2006 | Degen | |
| 2010/0040436 | A1 * | 2/2010 | Bruha | A01D 87/122 |
| | | | | 414/24.5 |
| 2014/0053527 | A1 * | 2/2014 | Spaniol | A01D 85/005 |
| | | | | 56/474 |
| 2016/0014966 | A1 | 1/2016 | Kraus et al. | |
| 2016/0014967 | A1 * | 1/2016 | Kraus | A01D 85/005 |
| | | | | 414/812 |
| 2016/0014968 | A1 * | 1/2016 | Kraus | A01D 85/005 |
| | | | | 414/812 |
| 2016/0014969 | A1 | 1/2016 | Kraus et al. | |
| 2016/0014970 | A1 | 1/2016 | Kraus et al. | |
| 2016/0014971 | A1 | 1/2016 | Kraus | |
| 2016/0366832 | A1 * | 12/2016 | Kraus | A01F 15/0883 |
| 2017/0112070 | A1 * | 4/2017 | Kraus | A01F 15/0883 |
| 2017/0290266 | A1 * | 10/2017 | Jones | A01D 85/005 |
| 2017/0290271 | A1 * | 10/2017 | Jones | A01D 85/005 |
| 2018/0020621 | A1 * | 1/2018 | Jones | A01D 85/005 |
| | | | | 56/341 |
| 2019/0045718 | A1 * | 2/2019 | Kraus | A01F 15/0765 |

FOREIGN PATENT DOCUMENTS

| | | |
|---|---|---|
| CA | 2709397 | 5/2000 |
| DE | 2851117 | 6/1980 |
| EP | 983720 | 3/2000 |
| EP | 2923560 | 9/2015 |
| FR | 2679410 | 1/1993 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2014031355 | 2/2014 |

* cited by examiner

MECHANICAL LINKAGE FOR AGRICULTURAL ACCUMULATOR INCLUDING EXTENDABLE CARRIAGES

CROSS-REFERENCE TO RELATED APPLICATIONS

This application claims priority to U.S. Provisional Patent Application No. 62/320,173, filed Apr. 8, 2016, the content of which is incorporated herein by reference.

BACKGROUND

The present disclosure relates to a mechanical linkage for an agricultural accumulator including extendable carriages to support crop packages.

SUMMARY

In one aspect, an accumulator is coupled to an agricultural baler and is configured to support a crop package exiting the baler. The accumulator includes a frame having a first end, a second end, and a support surface positioned between the first and the second ends. The support surface is configured to support the crop package that exits the baler. The accumulator also includes a carriage coupled to the first end of the frame and linearly moveable relative to the frame between a retracted position and an extended position. The carriage is configured to support the crop package when in the extended position. The accumulator further includes a linkage coupled to at least one of the frame and the carriage. The linkage is configured to move the carriage to at least one of the extended and retracted positions.

In another aspect, an accumulator is coupled to an agricultural baler and is configured to support a crop package exiting the baler. The accumulator includes a frame having a first end, a second end, and a support surface positioned between the first and the second ends. The support surface is configured to support the crop package that exits the baler. The accumulator also includes a carriage coupled to the first end of the frame and moveable relative to the frame between a retracted position and an extended position. The carriage is configured to support the crop package when in the extended position. The accumulator further includes a linkage coupled to at least one of the frame and the carriage. The linkage is configured to move the carriage to at least one of the retracted and extended positions. The linkage is also configured to retain the carriage in the retracted position.

In yet another aspect, an accumulator is coupled to an agricultural baler and is configured to support a crop package exiting the baler. The accumulator includes a frame having a first end, a second end, and a support surface positioned between the first and the second ends. The support surface is configured to support the crop package that exits the baler. The accumulator also includes a carriage coupled to the first end of the frame and moveable relative to the frame between a retracted position and an extended position. The carriage is configured to support the crop package when in the extended position. The accumulator further includes a locking subassembly coupled to at least one of the frame and the carriage. The locking subassembly is configured to selectively lock the carriage in the retracted position. The locking subassembly is also configured to automatically unlock the carriage from the retracted position such that the carriage is moveable into the extended.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
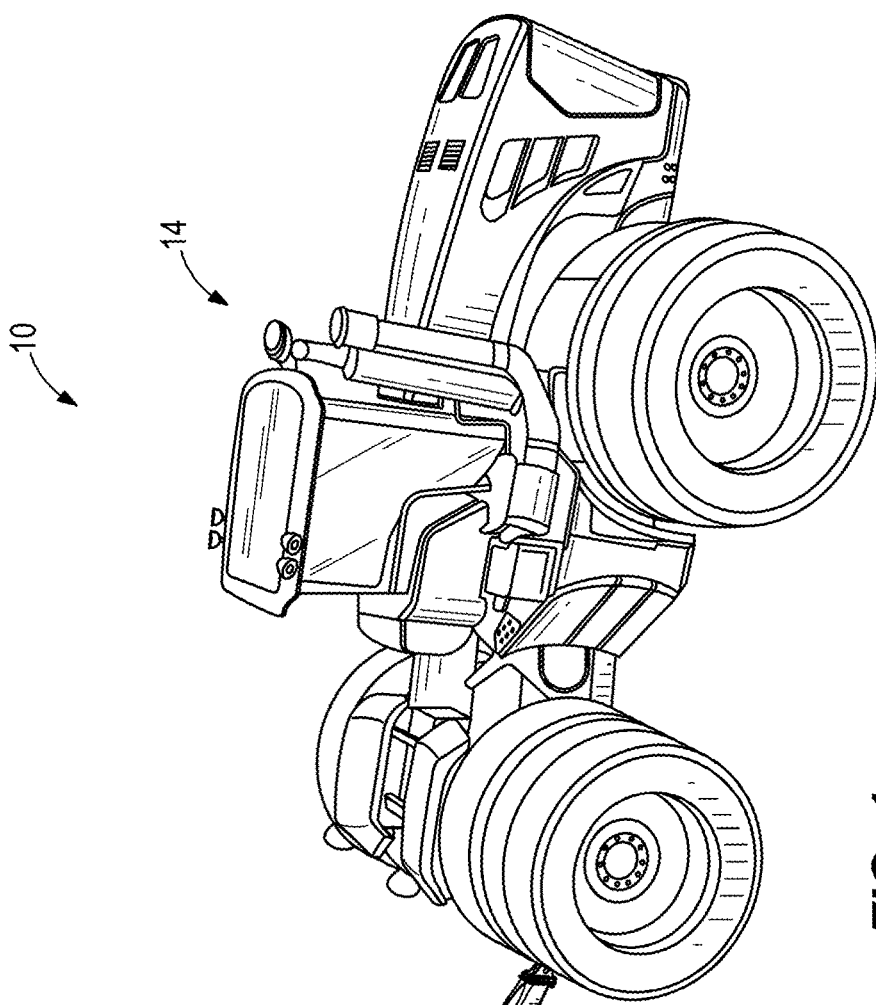
FIG. 1 is a perspective view of agricultural equipment including a vehicle coupled to an agricultural baler and an accumulator according to an embodiment of the disclosure.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14, which moves the baler 18 and the accumulator 22 during an agricultural process (e.g., through an agricultural field). The tractor 14 also supplies operational power in the form of hydraulic, electrical, and/or mechanical power to the baler 18 and the accumulator 22.

The illustrated baler 18 is configured to produce cylindrical crop packages, e.g., round bales, from an agricultural field. For example, the baler 18 may produce crop packages from hay, corn stalks, and the like. In other embodiments, the baler 18 may produce cuboid crop packages, e.g., square bales. In the illustrated embodiment, the baler 18 includes a baler front frame 26 to which a baler rear frame or a gate 30 is pivotally positionable between a closed position (FIG. 1) and an open position (FIG. 5) by hydraulic actuators 34, e.g., hydraulic cylinders. In other embodiments, the baler gate 30 may translate or slide between the closed position and the open position.

Figure 2:
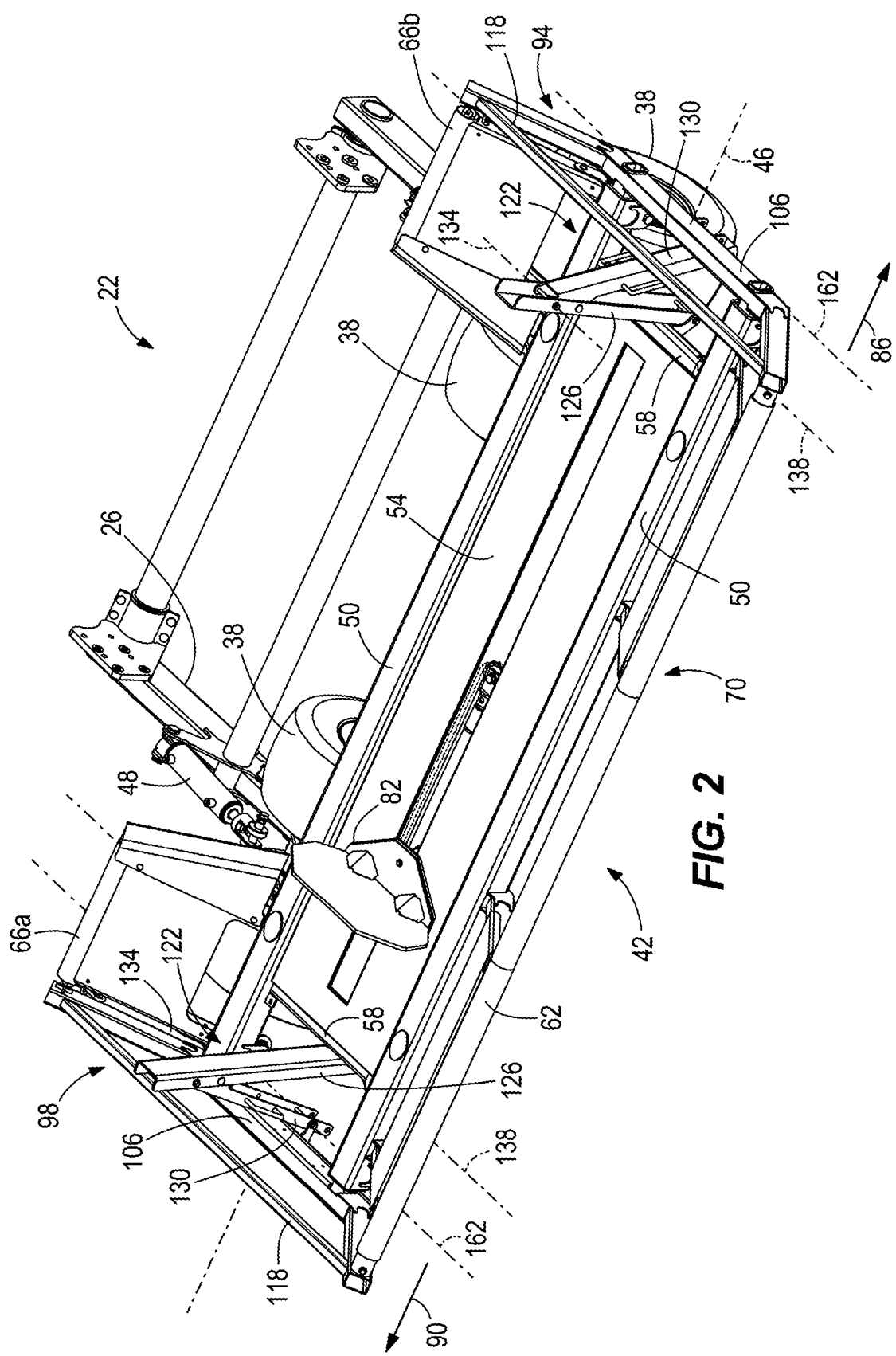
FIG. 2 is a perspective view of the accumulator of FIG. 1 including extendable carriages in a retracted position.
Figure 3:
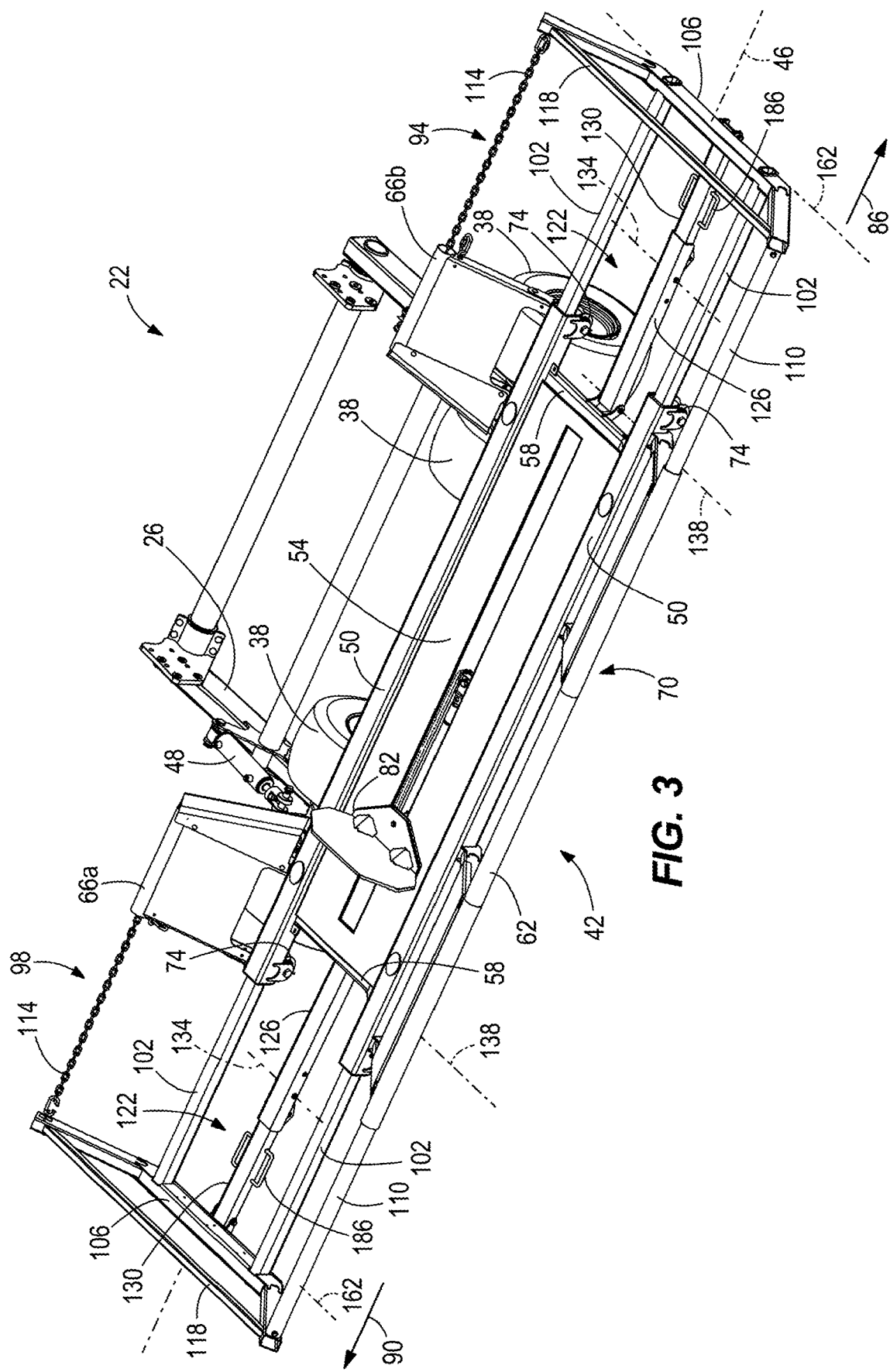
FIG. 3 is a perspective view of the accumulator of FIG. 1 including the extendable carriages in an extended position.
Figure 6:
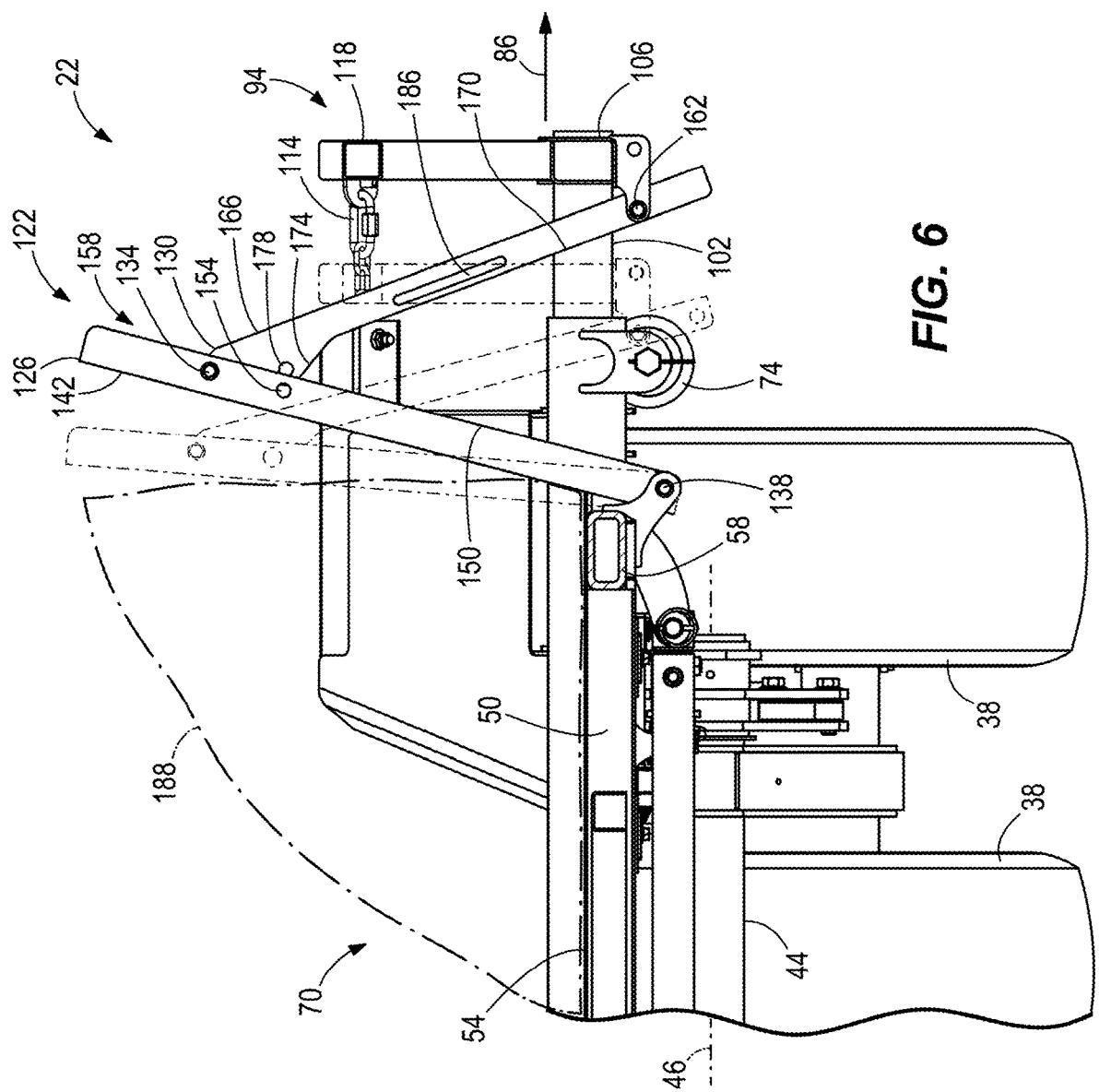
FIG. 6 is a rear view of the accumulator of FIG. 5 including the mechanical linkage and one of the extendable carriages in the retracted position.

With continued reference to FIGS. 1 and 2, the illustrated accumulator 22 is coupled to the accumulator base frame 26 such that the baler 18 and the accumulator 22 are supported above a surface or an agricultural field by at least one common axle and associated structure, e.g., wheels 38, although the accumulator can have its own dedicated axles, wheels, and other supporting structural components. An accumulator cart frame 42 is coupled relative to the accumulator base frame 26 about a tube 44 (FIG. 6). The tube 44 defines a rotational axis 46, with the accumulator cart frame 42 pivotable about the rotational axis 46 relative to the accumulator base frame 26 via hydraulic actuators 48 coupled therebetween. The accumulator cart frame 42 includes lower frame members 50, a support plate 54, frame cross members 58, and side frame members 62, 66 defining a carriage 70 configured to support a crop package exiting the baler 18. In the illustrated embodiment, the lower frame members 50 and the side frame member 62, 66 are tubular (e.g., circular, square, etc.) frame members with the lower frame members 50 each including a pair of roller wheels 74 attached to distal ends (e.g., attached adjacent to openings of the hollow frame members 50; FIG. 3). The illustrated first side frame member 62 spans the entire length of the accumulator cart frame 42 (e.g., continuous or discontinuous), whereas the second side frame members 66a, 66b are located adjacent the baler 18 and each span a portion of the accumulator cart frame 42 on either side of the baler discharge opening. The support plate 54 and the frame cross members 58 extend between the lower frame members 50 with a bale moving member 82 (e.g., a crop package engagement member) projecting from a slot within the support plate 54. The bale moving member 82 is illustrated as a plate member oriented substantially perpendicular to the support plate 54 and is slidable in a first direction 86 (i.e. towards a right side of the accumulator 22) and a second direction 90 (i.e. towards a left side of the accumulator 22). In the illustrated embodiment, the bale moving member 82 is operable by a hydraulic system driven by the tractor 14. In other embodiments, the bale moving member 82 is operable by an electric or hydraulic actuator or motor coupled to the accumulator 22.

With reference to FIGS. 2 and 3, the illustrated accumulator 22 also includes a first extendable carriage 94 (e.g., a first extendable wing) and a second extendable carriage 98 (e.g., a second extendable wing) both independently moveable substantially parallel to the rotational axis 46 between a retracted position (FIG. 2) and an extended position (FIG. 3). In other words, the carriages 94, 98 are linearly moveable between the retracted position and the extended position. In other embodiments, the carriages 94, 98 are moveable at an oblique angle relative to the rotational axis 46. In further embodiments, the carriages 94, 98 may be pivotably coupled to the accumulator frame 42. Each of the illustrated extendable carriages 94, 98 is sized and configured to support a crop package that exits the baler 18. The illustrated extendable carriages 94, 98 each include lower carriage members 102, a carriage cross member 106, side carriage members 110, 114, and an upper carriage member 118 extending between the side carriage members 110, 114. Each of the lower carriage members 102 is receivable within a corresponding lower frame member 50 to be in rolling or sliding engagement with one of the roller wheels 74. Likewise, the first side carriage member 110 is receivable within the first side frame member 62. The illustrated second side carriage member 114 is in the form of a linked chain coupled between the second side frame members 66a, 66b and the upper carriage member 118. The linked chain may consist of a tube or set of tubes configured to collapse or pass through the length of the second side frame members 66a, 66b.

Figure 4:
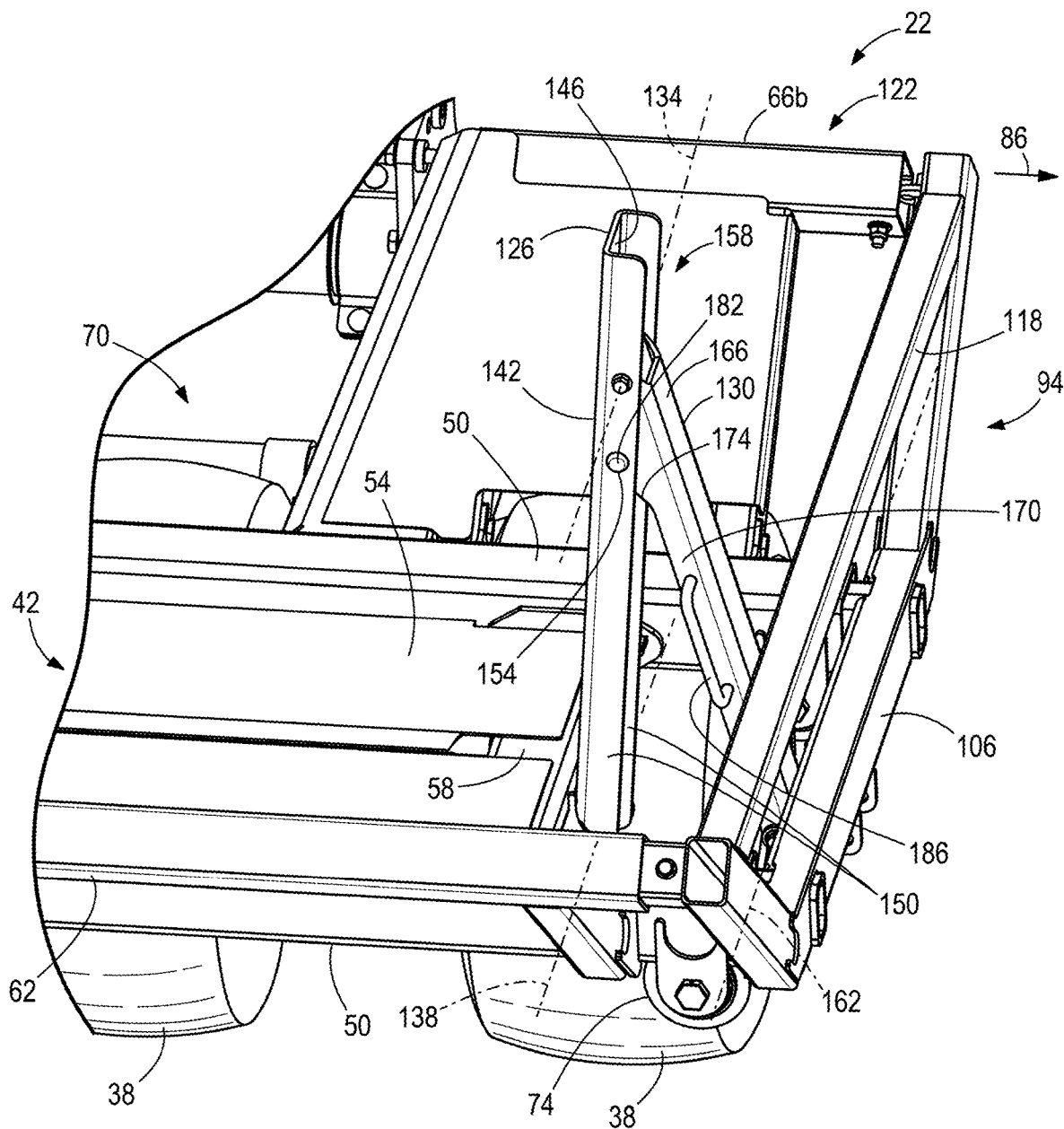
FIG. 4 is a perspective view of a mechanical linkage coupled between a frame of the accumulator and one of the extendable carriages.

With reference to FIGS. 2-4, linkage assemblies or locking linkages 122 are coupled to each side of the accumulator 22 between one of the extendable carriages 94, 98 and the accumulator cart frame 42 to link the extendable carriages 94, 98 to the accumulator cart frame 42. Each illustrated linkage 122 includes a first linkage member 126 pivotably coupled to a second linkage member 130 about a first movable pivot axis 134. In other embodiments, the linkage 122 may include one or more linkage members. In further embodiments, the linkage 122 may be at least one of a hydraulic actuator, a spring, an electrical actuator, or any combination thereof.

The first linkage member 126 is centrally attached to the frame cross member 58 and pivotable about a second pivot axis 138. In other embodiments, the first linkage member 126 may be coupled to any portion of the accumulator cart frame 42. The illustrated first linkage member 126 defines a top surface 142, a bottom surface 146 opposite the top surface 142, and opposing flanges 150 so that the first linkage member 126 is channel-shaped or U-shaped in cross section. Apertures 154 are formed in each flange 150 near the first pivot axis 134. In the illustrated embodiment, a portion of the bottom surface 146 positioned between the first pivot axis 134 and the end of the first linkage member 126 (i.e. the end opposite to the second pivot axis 138) is defined as an overlap portion 158.

The second linkage member 130 is centrally attached to the carriage cross member 106 and pivotable about a third pivot axis 162. In other embodiments, the second linkage member 130 may be coupled to any portion of the extendable carriages 94, 98 to correspond with a position of the first linkage member 126 attached to the accumulator cart frame 42. The illustrated second linkage member 130 defines a top surface 166 and opposing flanges 170 so that the second linkage member 130 is channel-shaped or U-shaped in cross section. A protrusion 174 having an aperture 178 is formed on each flange 170 near the first pivot axis 134 (FIG. 6). The apertures 154 of the first linkage member 126 and the apertures 178 of the second linkage member 130 are sized to concentrically align with each other such that a locking subassembly (e.g., a pin 182) can be inserted therethrough. A handle 186 is coupled to each flange 170 positioned between the third pivot axis 162 and the apertures 178. In other embodiments, only one handle 186 may be coupled to the second linkage member 130, the handle 186 may be omitted, or the second linkage member 130 may have integral features that function as a handle, (e.g., holes, edge profiles, etc.).

In operation, the extendable carriages 94, 98 are initially locked or retained in the retracted position by the linkage assemblies 122, as illustrated in FIG. 2, for ease of transportation and condensed storage of the accumulator 22. In particular, the lock pin 182 of the linkage 122 is inserted into the apertures 154, 178 to inhibit the linkage members 126, 130 from pivoting relative to each other and thus inhibiting the extendable carriages 94, 98 from linear movement in the axial direction relative to the accumulator cart frame 42. Alternatively, the pin may include a shackle, loop, or chain to hold the linkage members 126, 130 in place.

Figure 5:
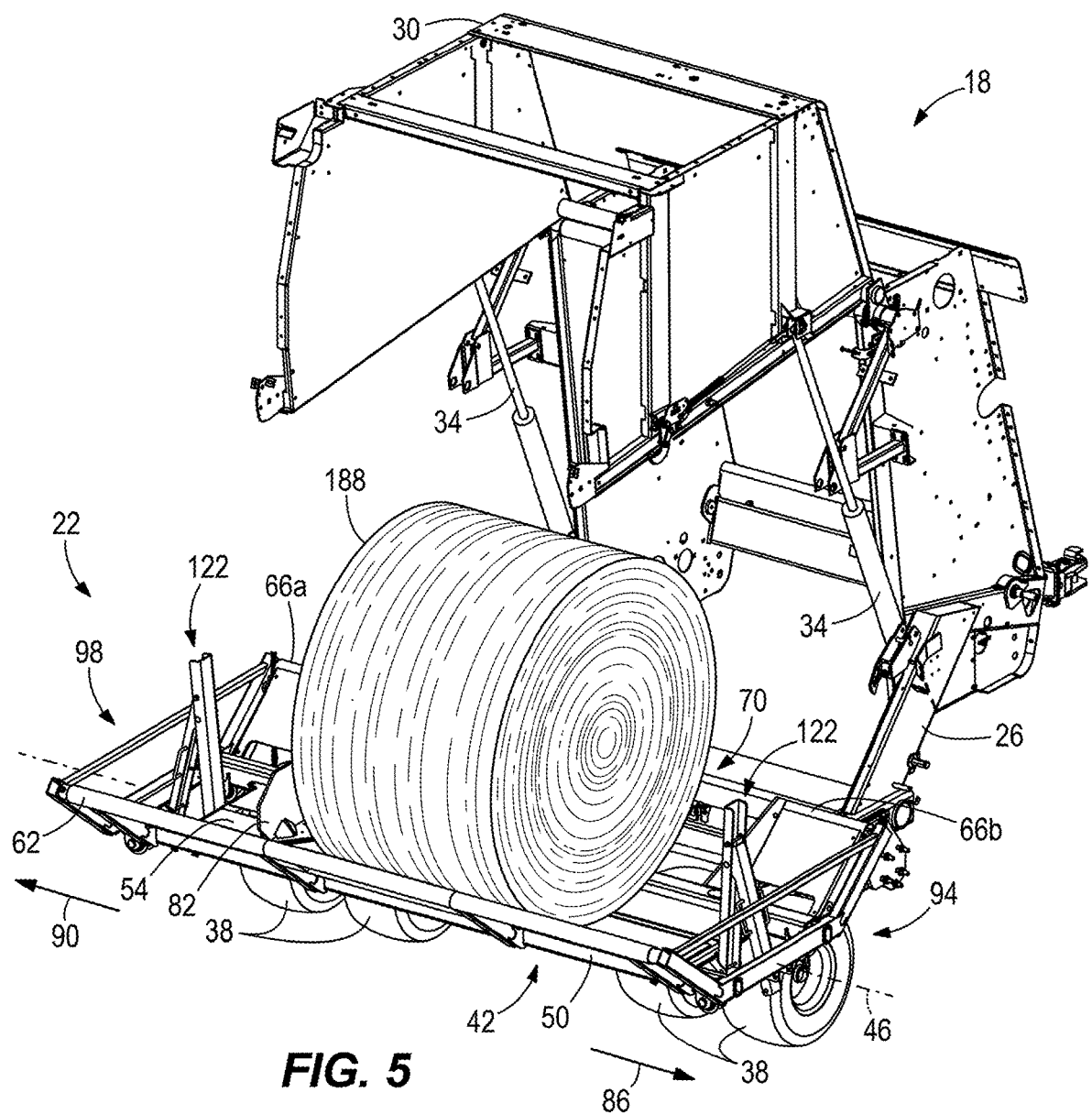
FIG. 5 is a perspective view of the baler and the accumulator of FIG. 1 with a first crop package located on the accumulator.

As illustrated in FIG. 5, when the extendable carriages 94, 98 are in the retracted position, the accumulator 22 can only support a single crop package 188 on the accumulator cart frame 42. As such, in some embodiments, after every crop package 188 the baler 18 creates, the accumulator 22 is rotated about the rotational axis 46 via the hydraulic actuators 48 to allow the crop package 188 to roll off the accumulator cart frame 42 and onto the agricultural field.

Figure 7:
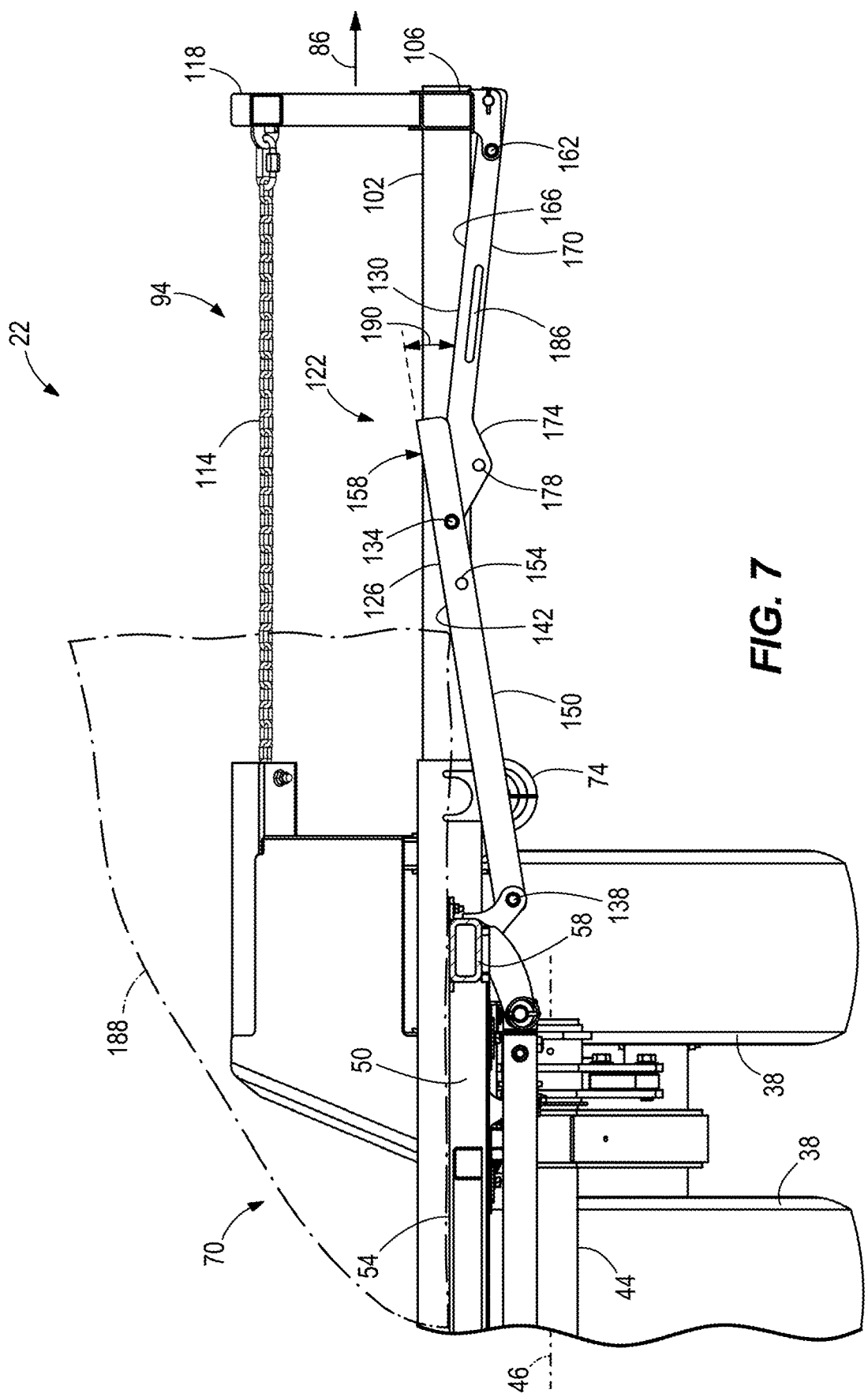
FIG. 7 is a rear view of the accumulator of FIG. 5 including the mechanical linkage and one of the extendable carriages in an intermediate position.
Figure 8:
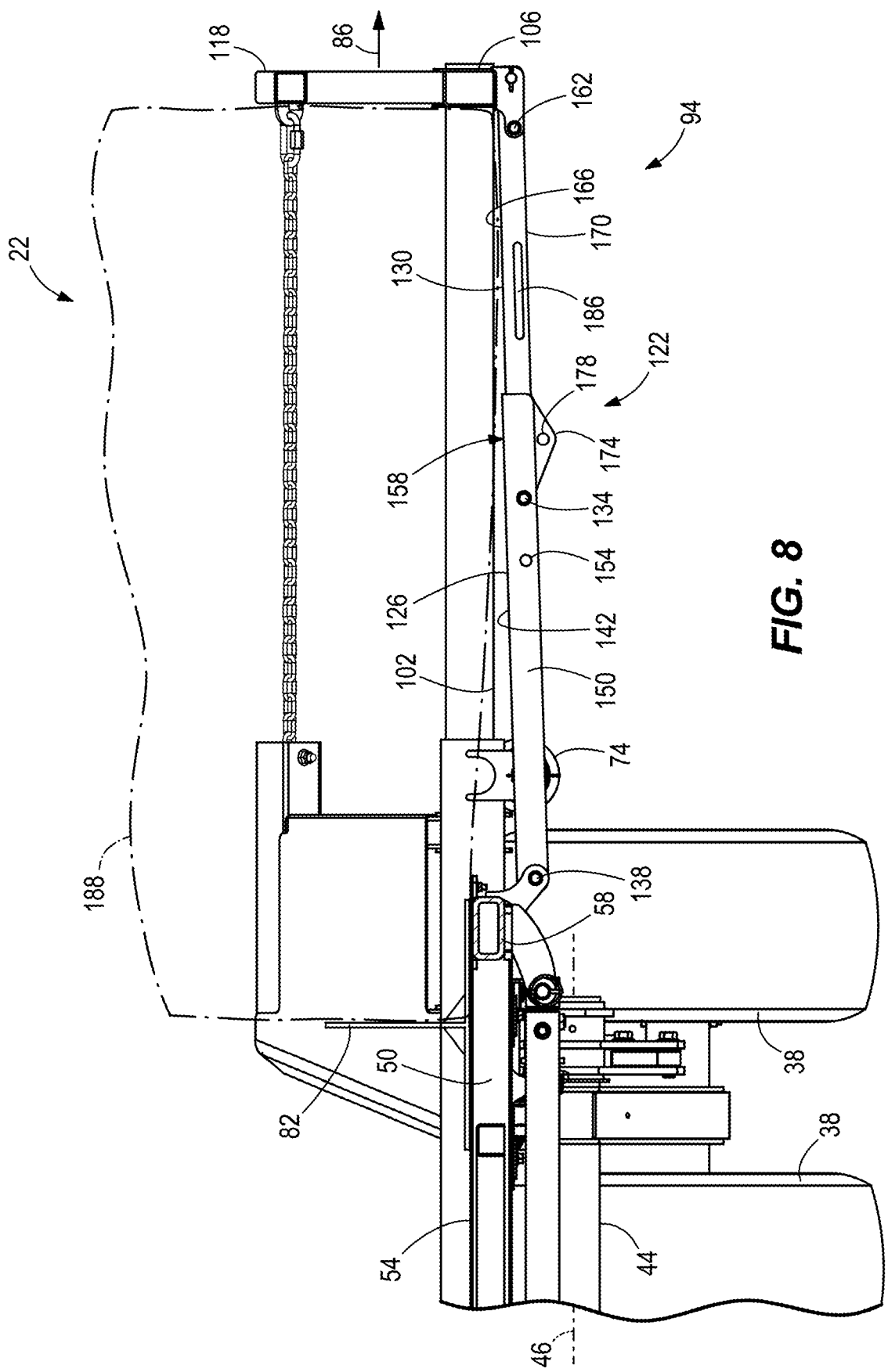
FIG. 8 is a rear view of the accumulator of FIG. 5 including the mechanical linkage and one of the extendable carriages in the extended position.

To permit the accumulator 22 to support more than one (e.g., two or three) crop package 188 at a time, the extendable carriages 94, 98 can be moved into the extended position (FIG. 3). In particular, the lock pin 182 is removed from the apertures 154, 178, thereby allowing relative movement of the linkage members 126, 130. With reference to FIGS. 6-8 (illustrating the right side of the accumulator 22), the linkage 122 transitions through multiple stages as the first extendable carriage 94 moves from the retracted position to the extended position, as described in more detail below. Only the operation of the first extendable carriage 94 will be discussed below, but the same operation is applicable to the second extendable carriage 98, which, in this embodiment, is independently operable relative to the first extendable carriage 94.

As the crop package 188 exits the baler 18, the bale moving member 82 moves in either direction 86, 90 to push the crop package 188. For example, the bale moving member 82 pushes the crop package 188 in the first direction 86 towards the first extendable carriage 94 to initially abut against the top surface 142 of the first linkage member 126, as illustrated in phantom lines within FIG. 6. As the bale moving member 82 continues to move the crop package 188 in the first direction 86, the crop package 188 pushes against the top surface 142 to release the first extendable carriage 94 from the retracted position by pivoting the first linkage member 126 about the second pivot axis 138 (clockwise in FIG. 6), thereby concurrently pivoting the second linkage member 130 about the third pivot axis 162 (counterclockwise in FIG. 6). After initial contact of the crop package 188 against the first linkage member 126, gravity acts on the linkage 122 (i.e., a threshold moment about the pivot points 138, 162 is reached due to the weight and interaction of the linkage members 126, 130) to automatically move the first extendable carriage 94 without any additional force acting on the first extendable carriage 94 or the linkage 122. Thus, rotational movement of the linkage assembly 122 provides generally linear movement of the first extendable carriage 94. Movement of the first extendable carriage 94 can also be manually initiated by the operator (e.g., by pulling on the first extendable carriage 94 in the first direction 86).

The illustrated linkage 122 also functions as an over-center linkage in that the linkage 122 includes two stable equilibrium states. Specifically, the first stable equilibrium state is illustrated in FIG. 7 wherein the linkage members 126, 130 are oriented at an oblique angle 190. The linkage members 126, 130 will remain at this oblique angle 190 until an additional force acts on the linkage members 126, 130 to move or "snap" the linkage members 126, 130 into the second stable equilibrium state as illustrated in FIG. 8. Stated another way, the over-center linkage includes two local minima of potential energy (see the orientations of the linkage in FIGS. 7 and 8) separated by a local maximum of potential energy (e.g., the additional force applied to the linkage 122). In some embodiments, the additional force is applied to the linkage 122 by the operator pushing down on the linkage 122, by the crop package 188 traveling over the linkage 122, or by gravity providing momentum to the linkage 122 to snap the linkage 122 into the second equilibrium state from the first equilibrium state. In other embodiments, the linkage 122 is not an over-center linkage so that no additional force is required to move the linkage 122 into the orientation as illustrated in FIG. 8.

In the second stable equilibrium state (FIG. 8), the linkage members 126, 130 are substantially parallel to each other but are oriented at an oblique angle relative to the rotational axis 46. The overlap portion 158 of the first linkage member 126 contacts the top surface 166 of the second linkage member 130, e.g., the overlap portion 158 surrounds a portion of the second linkage member 130. In other embodiments, the linkage members 126, 130 may be inversed so that the second linkage member 130 includes the overlap portion 158 that surrounds a portion of the first linkage member 126. This engagement or positive stop between the linkage members 126, 130 inhibits the linkage members 126, 130 from over rotating causing the first extendable carriage 94 to move back towards the retracted position. The second stable equilibrium state also functions as an automatic lock (e.g., does not require a lock pin or the like) to inhibit the first extendable carriage 94 from moving in the second direction 90.

The linkage 122 also functions as a motion multiplier to fully extend the first extendable carriage 94 before the crop package 188 is fully moved by the bale moving member 82 and seated within the first extendable carriage 94 (e.g., when the crop package 188 is adjacent the upper carriage member 118; FIG. 8). In the extended position, top surfaces 142, 166 of the linkage members 126, 130 also provide an additional support surface to support the crop package 188 thereon. For example, a smaller diameter crop package 188 can be at least partially supported by the linkage members 126, 130 as well as the lower carriage members 102 when the smaller diameter crop package 188 is positioned within the first extendable carriage 94. Without the linkage members 126, 130, the smaller diameter crop package 188 could fall between the lower carriage members 102 and onto the agricultural field or could get stuck between the lower carriage members 102. Furthermore, the linkage 122 provides additional structural support and aids in alignment between the accumulator cart frame 42 and the first extendable carriage 94, providing smoother extension and retraction of the carriages 94, 98.

After the three crop packages 188 (e.g., one crop package 188 located within each extendable carriage 94, 98, and one crop package 188 located on the accumulator cart frame 42) are removed from the accumulator 22, the extendable carriages 94, 98 can be moved back into the retracted position. In particular, the operator grabs the handles 186 and rotates the second linkage member 130 (clockwise in FIG. 8) against the additional force of the over-center linkage. This action of rotating the second linkage member 130 provides a mechanical advantage to the operator by creating a moment force that acts on the first extendable carriage 94 to axially move the first extendable carriage 94 in the second direction 90. The first linkage member 126 then pivots about the second axis 138 (e.g., counterclockwise) until the apertures 154, 178 align and the lock pin 182 can be inserted therethrough or until the carriage 94 reaches the fully retracted position via a positive stop.

The same operation as described above relative to the first extendable carriage 94 also applies to the operation of the second extendable carriage 98.

In other embodiments, the movement of the linkage 122 and the extendable carriages 94, 98 is automated such that the operator does not need to exit the tractor 14 to lock or unlock the linkage 122. An actuator (e.g., hydraulic, electronic, or the like) may be coupled to the linkage 122 to pivot the linkage members 126, 130 about their pivot axes 138, 162. The actuator may be controlled by the operator within the tractor 14, or the actuator may be operable in conjunction with operation of the baler 18 or the accumulator 22. For example, the actuator may move one of the carriages 94, 98 in the same direction as the movement of the bale moving member 82. In one embodiment, the actuator may be coupled to the bale moving member 82 so that movement of the bale moving member 82 may also move the actuator and ultimately the linkages 122. Stated another way, the bale moving member 82 and the actuator may be coupled to the same hydraulic system. In other embodiments, the hydraulic system coupled to the bale moving member 82 may be a separate and independent hydraulic system than that coupled to the actuator. The actuator may also automatically move the carriages 94, 98 into the retracted position once the accumulator 22 drops the crop packages 188 in the agricultural field. The actuator may further move the extendable carriages 94, 98 dependent upon a position of the bale gate 30, e.g., open or closed. Consequently, the extendable carriages 94, 98 are extendable or retractable by the actuator in any number of ways or modes.

Figure 9:
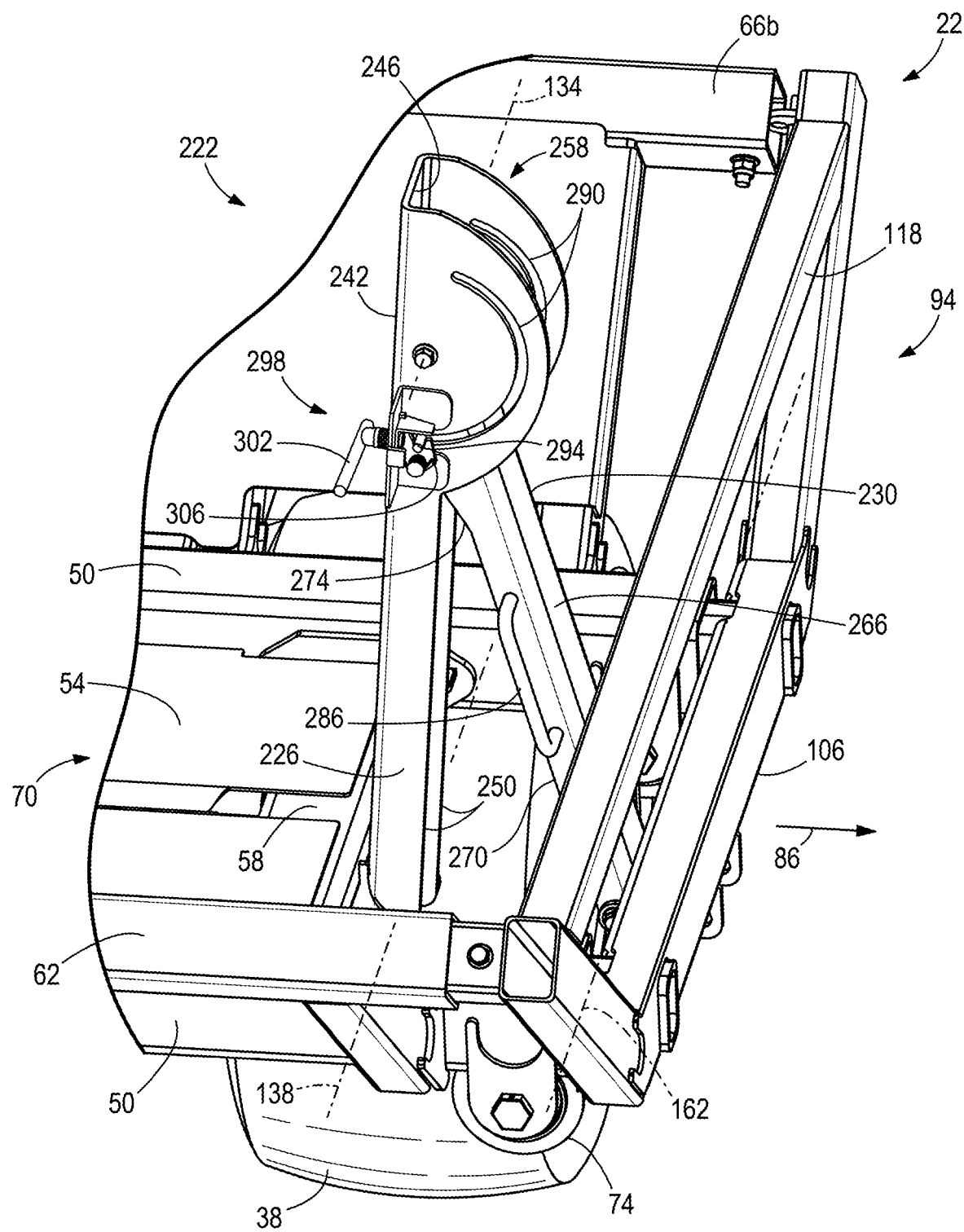
FIG. 9 is a perspective view of a mechanical linkage according to another embodiment of the disclosure coupled between the frame of the accumulator and one of the extendable carriages.

FIG. 9 illustrates a linkage 222 coupled between the accumulator cart frame 42 and the first extendable carriage 94 according to another embodiment. The linkage 222 is similar to the linkage 122; therefore, like components have been given like reference numbers incremented by 100 and the differences between the linkages will be discussed in detail. In addition, components or features described with respect to only one or some of the embodiments described herein are equally applicable to any other embodiments described herein.

The illustrated linkage 222 includes a first linkage member 226, which pivots about the second pivot axis 138, having a top surface 242, a bottom surface 246, opposing flanges 250, and an overlap portion 258. Each of the illustrated flanges 250 includes a curvilinear or other shaped portion that protrudes away from the bottom surface 246 with an arcuate slot or groove 290 formed therein. In other embodiments, only one of the flanges 250 may include the arcuate groove 290.

The illustrated linkage 222 also includes a second linkage member 230, which pivots about the third pivot axis 162, having a top surface 266, opposing flanges 270, protrusions 274, and a handle 286. One of the protrusions 274 includes a pin 294 oriented parallel to the first pivot axis 134. The pin 294 is received within one of the arcuate grooves 290. In other embodiments, the second linkage member 230 may include a pin 294 attached to the opposing protrusion 274.

A locking subassembly 298 (e.g., a latch) is coupled between the accumulator frame 42 and the first extendable carriage 94. For example, the locking subassembly 298 is coupled to one of the flanges 250 to overlap with a portion of one of the arcuate grooves 290. The locking subassembly 298 includes a handle 302 that actuates a rotatable latch 306 that is engageable with the pin 294. In the illustrated embodiment, the handle 302 is spring biased (e.g., via a torsional spring) into a position illustrated in FIG. 9. In another embodiment, the handle 302 and the rotatable latch 306 are not biased. In further embodiments, the first linkage member 226 may include two latch assemblies 298, each one associated with one flange 250.

In operation, the first extendable carriage 94 is locked in the retracted position when the rotatable latch 306 engages the pin 294. To move the first extendable carriage 94 into the extended position, the handle 302 is rotated to unlock the latch 306 allowing the pin 294 to disengage from the latch 306 to move within the arcuate groove 290 as the linkage members 226, 230 pivot relative to each other.

Figure 10:
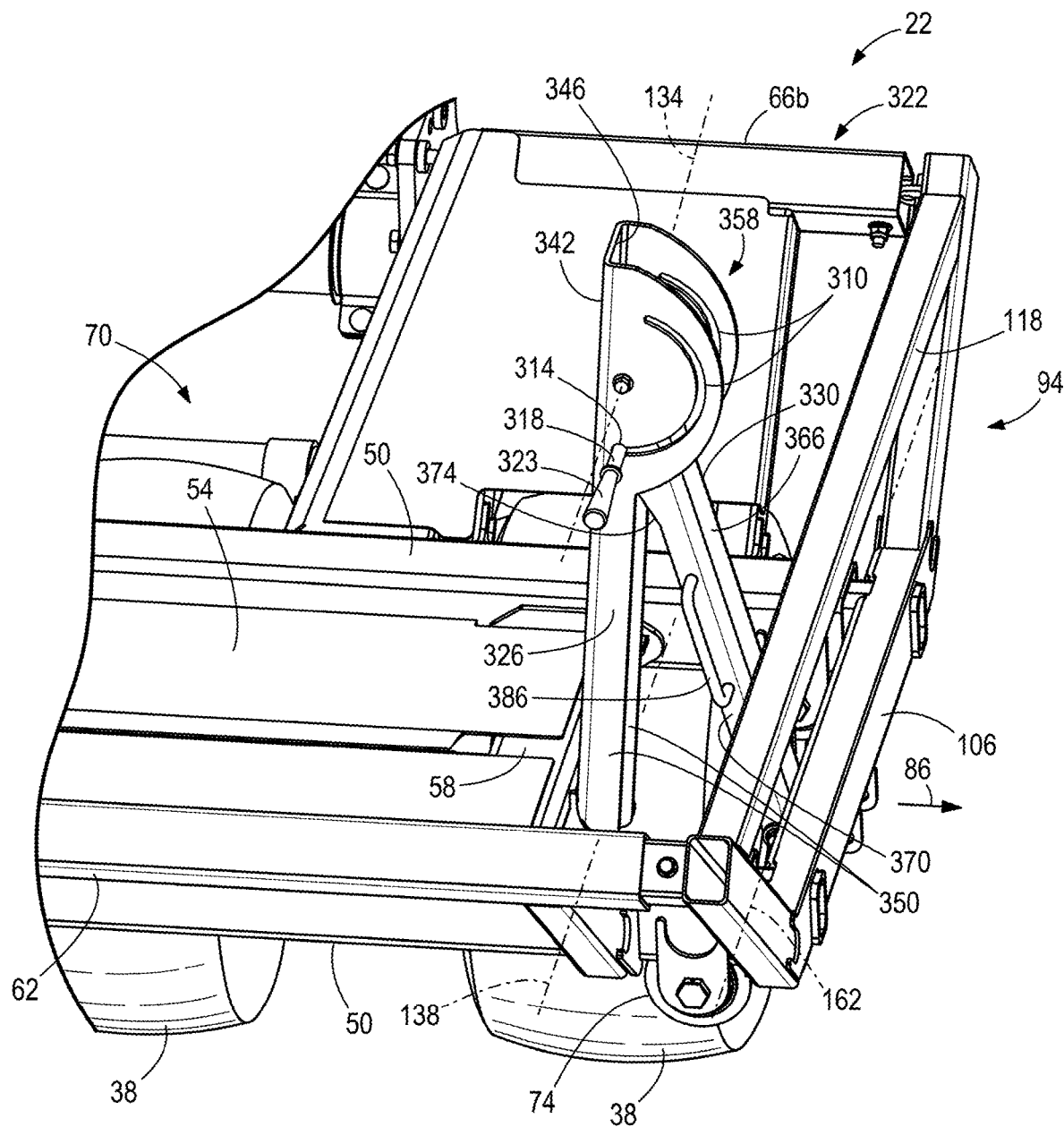
FIG. 10 is a perspective view of a mechanical linkage according to another embodiment of the disclosure coupled between the frame of the accumulator and one of the extendable carriages.

FIG. 10 illustrates a linkage 322 coupled between the accumulator cart frame 42 and the first extendable carriage 94 according to another embodiment. The linkage 322 is similar to the linkage 122; therefore, like components have been given like reference numbers incremented by 200 and the differences between the linkages will be discussed in detail. In addition, components or features described with respect to only one or some of the embodiments described herein are equally applicable to any other embodiments described herein.

The illustrated linkage 322 includes a first linkage member 326, which pivots about the second pivot axis 138, having a top surface 342, a bottom surface 346, opposing flanges 350, and an overlap portion 358. The illustrated flanges 350 include a curvilinear or other shaped portion that protrudes away from the bottom surface 346 with an arcuate slot or groove 310 formed therein and an oversized aperture 314 located at an end of the arcuate groove 310. The illustrated oversized aperture 314 has a width greater than the width of the arcuate groove 310. In other embodiments, only one of the flanges 350 may include the arcuate groove 310.

The illustrated linkage 322 also includes a second linkage member 330, which pivots about the third pivot axis 162, having a top surface 366, opposing flanges 370, protrusions 374, and a handle 386. The illustrated second linkage member 330 includes a locking subassembly 318 (e.g., a spring biased pin) attached to a handle 323 that is coupled to one of the protrusions 374 and is engageable within the oversized aperture 314 and slidable within the arcuate groove 310.

In operation, the first extendable carriage 94 is locked in the retracted position when the spring biased pin 318 engages the oversized aperture 314. To move the first extendable carriage 94 into the extended position, the handle 322 is axially moved out of engagement with the oversized aperture 314 allowing the spring biased pin 318 to move within the arcuate groove 310 as the linkage members 326, 330 pivot relative to each other.

FIGS. 11-19 illustrate a mechanical linkage 522 coupled between the accumulator cart frame 42 and the second extendable carriage 98 according to another embodiment. The linkage 522 is similar to the linkage 122; therefore, like components have been given like reference numbers incremented by 400 and the differences between the linkages will be discussed in detail. In addition, components or features described with respect to only one or some of the embodiments described herein are equally applicable to any other embodiments described herein.

Figure 13:
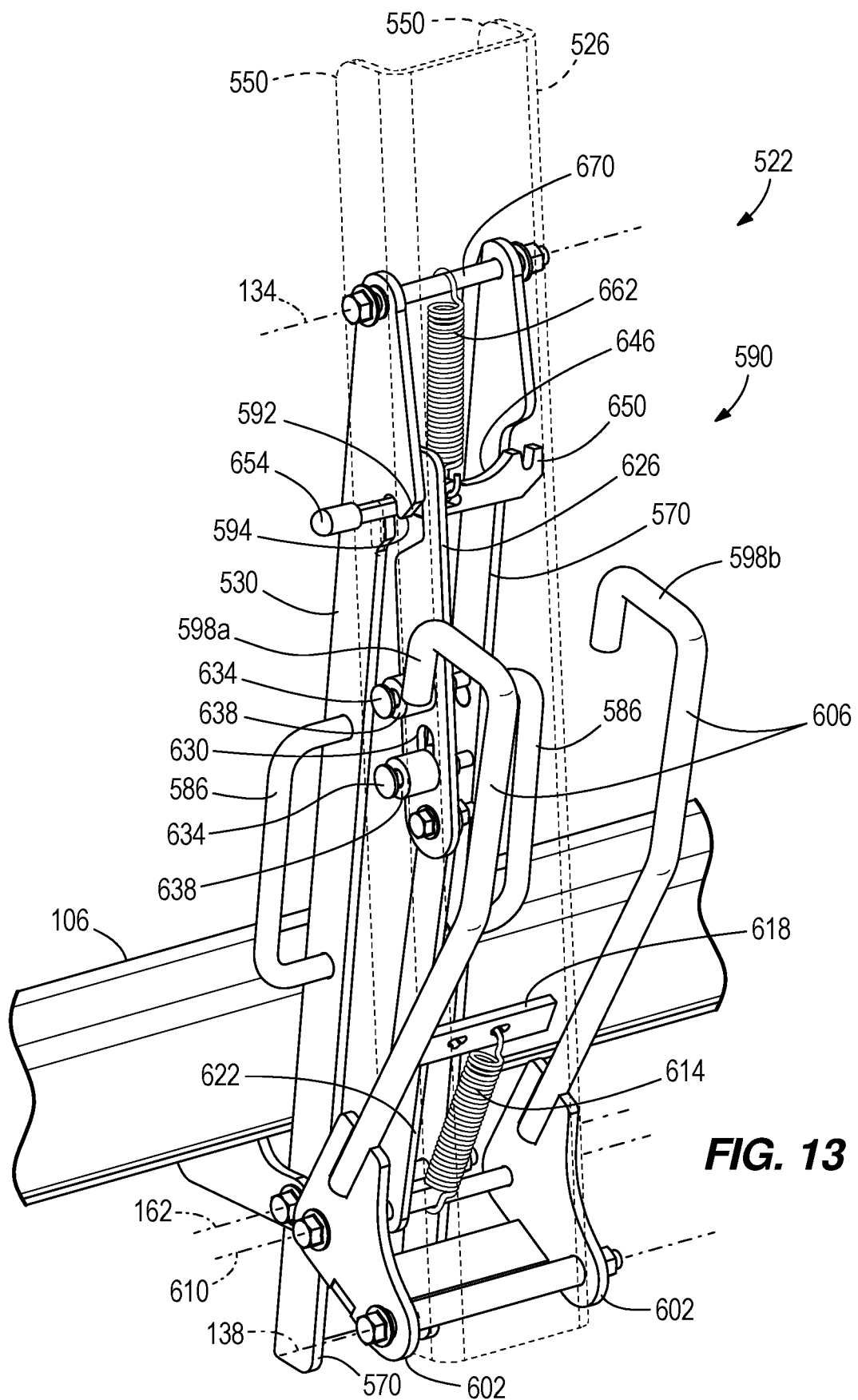
FIG. 13 is a second perspective view of the locking subassembly of FIG. 11 in the locked configuration.

The illustrated linkage 522 includes a first linkage member 526, a second linkage member 530, and a locking subassembly 590 coupled between the accumulator frame 42 and the second extendable carriage 98. In other embodiments, the locking subassembly 590 may be coupled between the accumulator frame 42 and the first linkage member 526, the locking subassembly 590 may be coupled between the second extendable carriage 98 and the second linkage member 530, and/or the locking subassembly 590 may be coupled between the first linkage member 526 and the second linkage member 530. The first linkage member 526 pivots about the second pivot axis 138 relative to the accumulator frame 42 and includes a top surface 542, a bottom surface 546, opposing flanges 550, and an overlap portion 558. The second linkage member 530 pivots about the third pivot axis 162 relative to the second extendable carriage 98 and includes a top surface 566, opposing flanges 570, and a handle 586. The illustrated second linkage member 530 also pivots relative to the first linkage member 526 about the first pivot axis 134. With reference to FIG. 13, one of the illustrated flanges 570 of the second linkage member 530 includes a beveled edge or surface 592 adjacent a hook 594 sized to engage a portion of the locking subassembly 590 as described in more detail below. The illustrated beveled edge 592 is oriented at an oblique angle relative to the top surface 566 of the second linkage member 530.

With reference to FIGS. 12-15, the illustrated locking subassembly 590 includes a pair of arms 598 (i.e., a first arm 598a and a second arm 598b) fixed to a respective base 602 with each arm 598a, 598b having an engaging surface 606. In other embodiments, the arms 598 share a single engaging surface 606. The illustrated bases 602 are pivotably coupled to the accumulator frame 42 about the second pivot axis 138 so that the arms 598 are also pivotable about the second pivot axis 138. In the illustrated embodiment, the first linkage member 526 is positioned between the arms 598a, 598b with a bolt 610, which is spaced from the second pivot axis 138 and positioned between the second and third pivot axes 138, 162, coupled to and extending between the bases 602. A first spring 614 is coupled to the bolt 610 and a bracket 618 that is fixed to the first linkage member 526 so that the bolt 610 is biased toward the bottom surface 546 of the first linkage member 526 about the second pivot axis 138. Consequently, the first spring 614 ultimately biases the engaging surfaces 606 of the arms 598 away from the top surface 542 of the first linkage member 526 about the second pivot axis 138. In other embodiments, at least one arm 598 may be positioned between the opposing flanges 550 of the first linkage member 526 (e.g., the at least one arm 598 may extend through an aperture formed in the top surface 542 of the first linkage member 526). In further embodiments, the locking subassembly 590 may only include one arm 598 pivotable about the second pivot axis 138. Also in further embodiments, a plate member may be coupled to both arms 598 defining the engaging surface 606 and extending across the top surface 542 of the first linkage member 526.

With continued reference to FIGS. 12-15, a linkage arm 622 is pivotably coupled to the bolt 610 at one end of the linkage arm 622 and is also pivotably coupled to a linkage actuator 626 at the other end of the linkage arm 622. The illustrated linkage actuator 626 is positioned below the bottom surface 546 and between the opposing flanges 550 of the first linkage member 526 and is linearly moveable relative to the first linkage member 526 in two directions that are substantially parallel to a plane that intersects the first and second pivot axes 134, 138. In particular, the linkage actuator 626 includes two elongated apertures 630 that each receives a bolt 634 fixed to the first linkage member 526. Each bolt 634 also receives a spacer/washer 638 positioned between the linkage actuator 626 and one of the flanges 550 of the first linkage member 526 so that the linkage actuator 626 does not directly contact the one flange 550. In other embodiments, one elongated aperture 630 may receive both bolts 634. The illustrated linkage actuator 626 also includes a finger 642 formed at one end of the linkage actuator 626 opposite the linkage arm 622 that engages a latch 646. In other embodiments, the finger 642 may be replaced with an aperture that receives the latch 646. The illustrated latch 646 is pivotably coupled relative to the first linkage member 526 at a first end portion 650. The latch 646 also extends between the opposing flanges 550 of the first linkage member 526 and includes a second end portion 654 extending through an elongated aperture 658 of one of the flanges 550 so that the second end portion 654 is positioned outside of both flanges 550. In the illustrated embodiment, the latch 646 is biased toward the first pivot axis 134 by a second spring 662. More specifically, the second spring 662 is coupled to the latch 646 between the opposing flanges 550 and is coupled to a pin 670 (e.g., a bolt) that defines the first pivot axis 134 to bias the latch 646 toward the pin 670. In other embodiments, the latch 646 may pivot and/or translate relative to the first linkage member 526. In further embodiments, the latch 646 may be coupled to the second linkage member 530.

Figure 11:
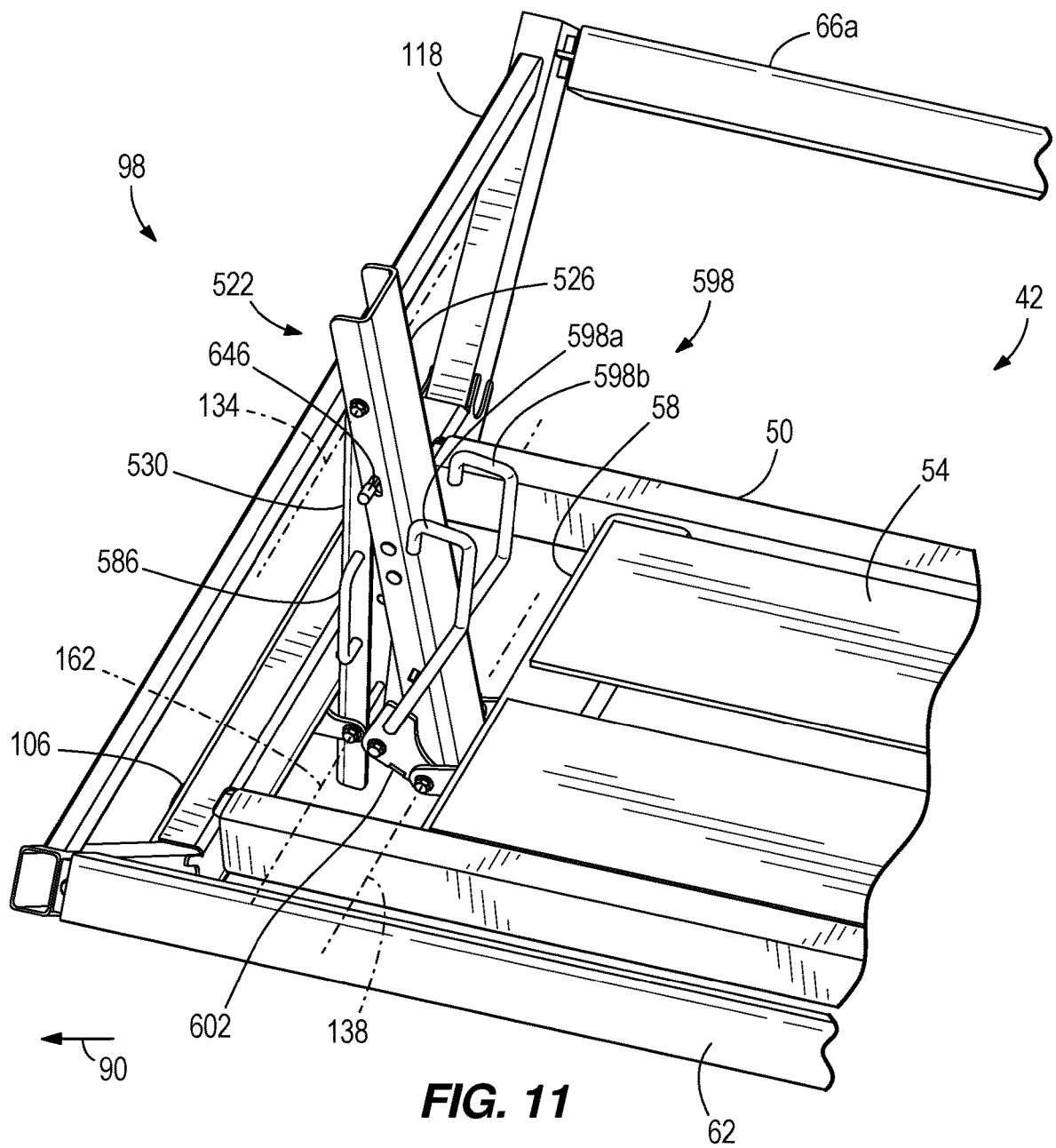
FIG. 11 is a perspective view of a mechanical linkage including a locking subassembly according to another embodiment of the disclosure coupled between the frame of the accumulator and one of the extendable carriages.
Figure 12:
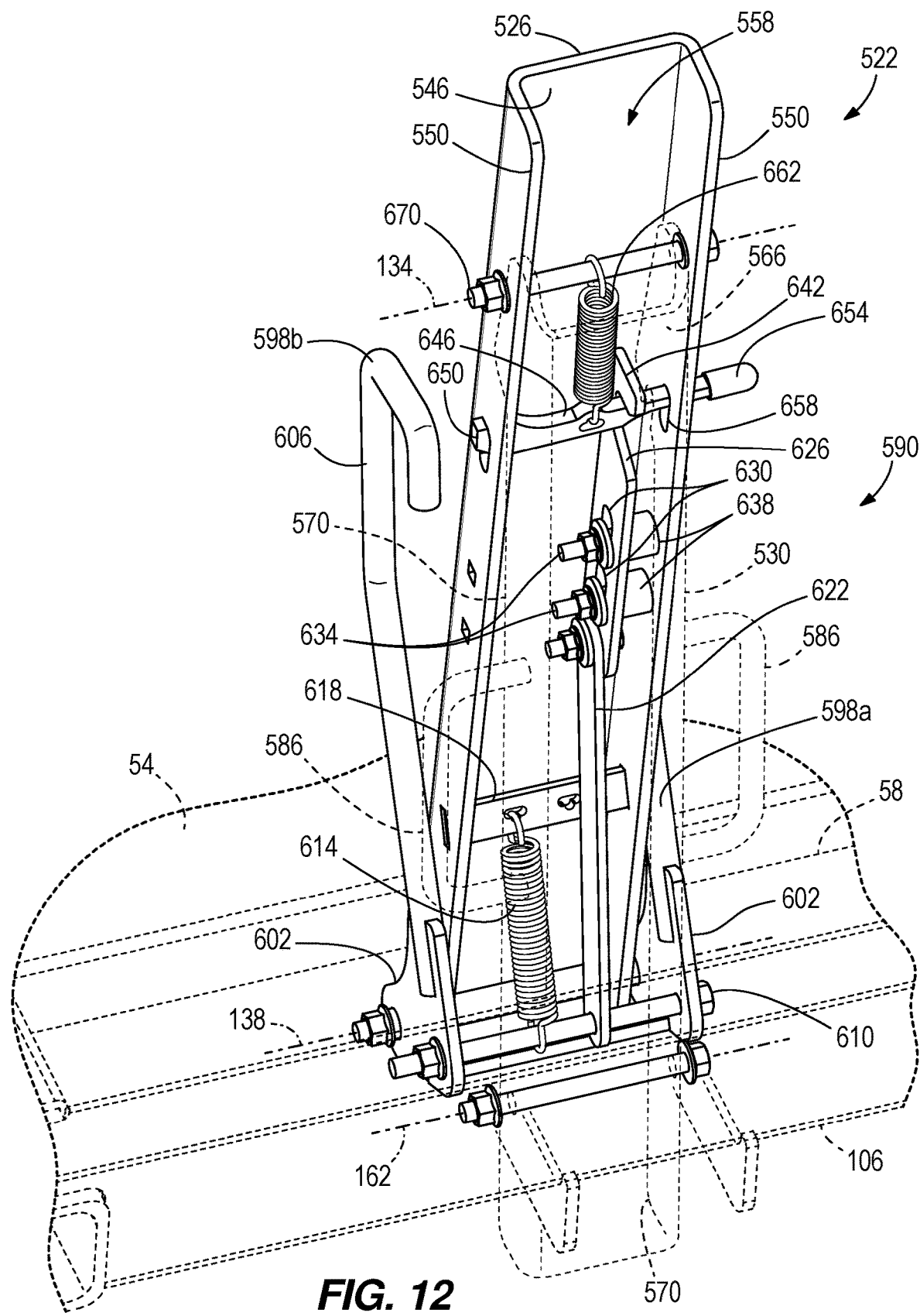
FIG. 12 is a first perspective view of the locking subassembly of FIG. 11 in a locked configuration.

As illustrated in FIGS. 12 and 13, the locking subassembly 590 is in a locked configuration to lock or retain the second extendable carriage 98 in the retracted position relative to the accumulator frame 42 (FIG. 11). The locked configuration is defined by the latch 646 engaging or received within the hook 594 of the second linkage member 530. In the illustrated embodiment, the second spring 662 biases the latch 646 toward the first pivot axis 134 so that a longitudinal axis of the latch 646 is substantially parallel to the first pivot axis 134, thereby positioning a portion of the latch 646 within the hook 594. Once the portion of the latch 646 is positioned within the hook 594 (e.g., the hook 594 is fixed between the latch 646 and the bottom surface 546 of the first linkage member 526), the second linkage member 530 is prevented from rotating relative to the first linkage member 526 about the first pivot axis 134. Stated another way, a distance between the second and third pivot axes 138, 162 is fixed when the locking subassembly 590 is in the locked configuration.

Figure 14:
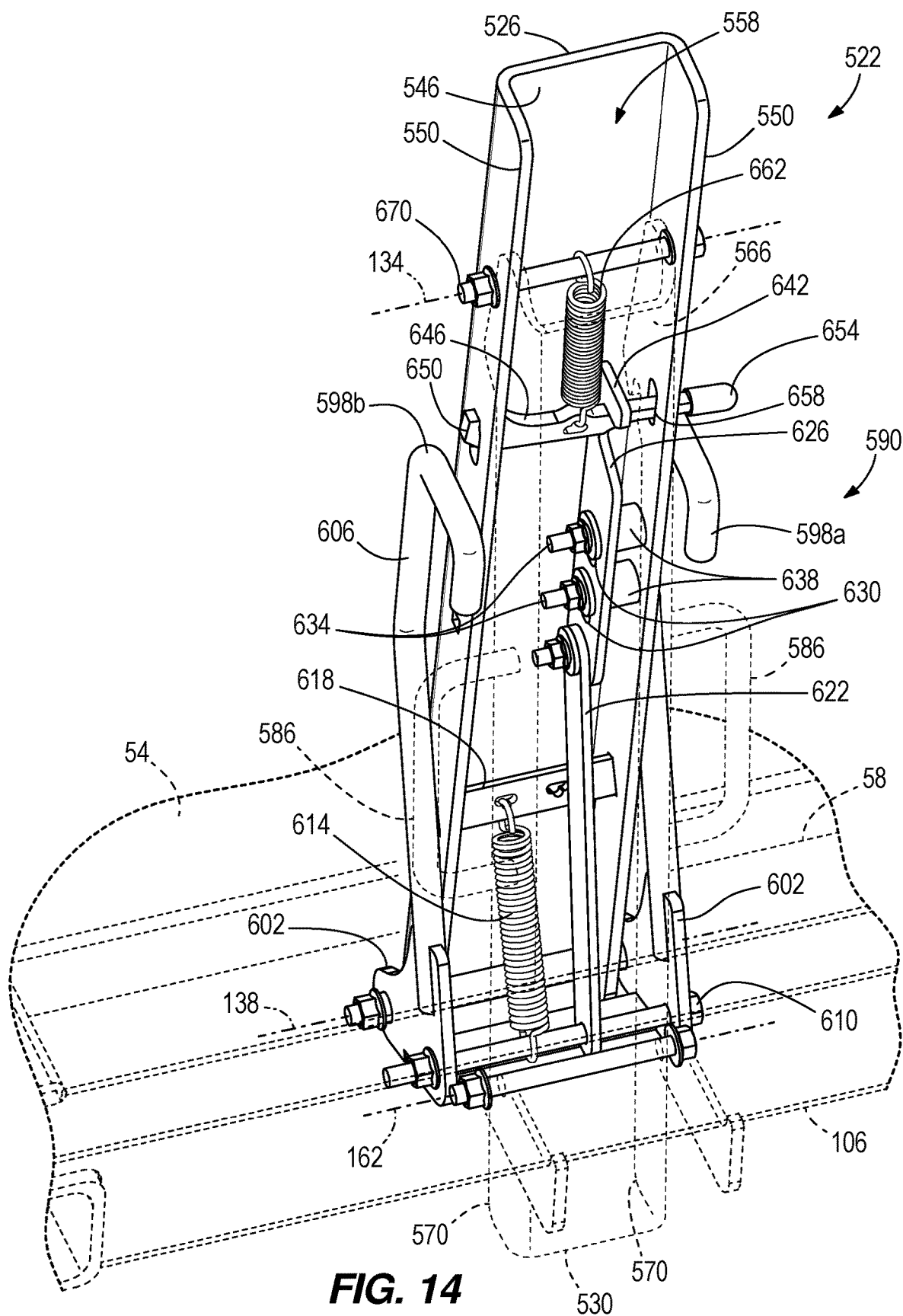
FIG. 14 is a first perspective view of the locking subassembly of FIG. 11 in an unlocked configuration.
Figure 15:
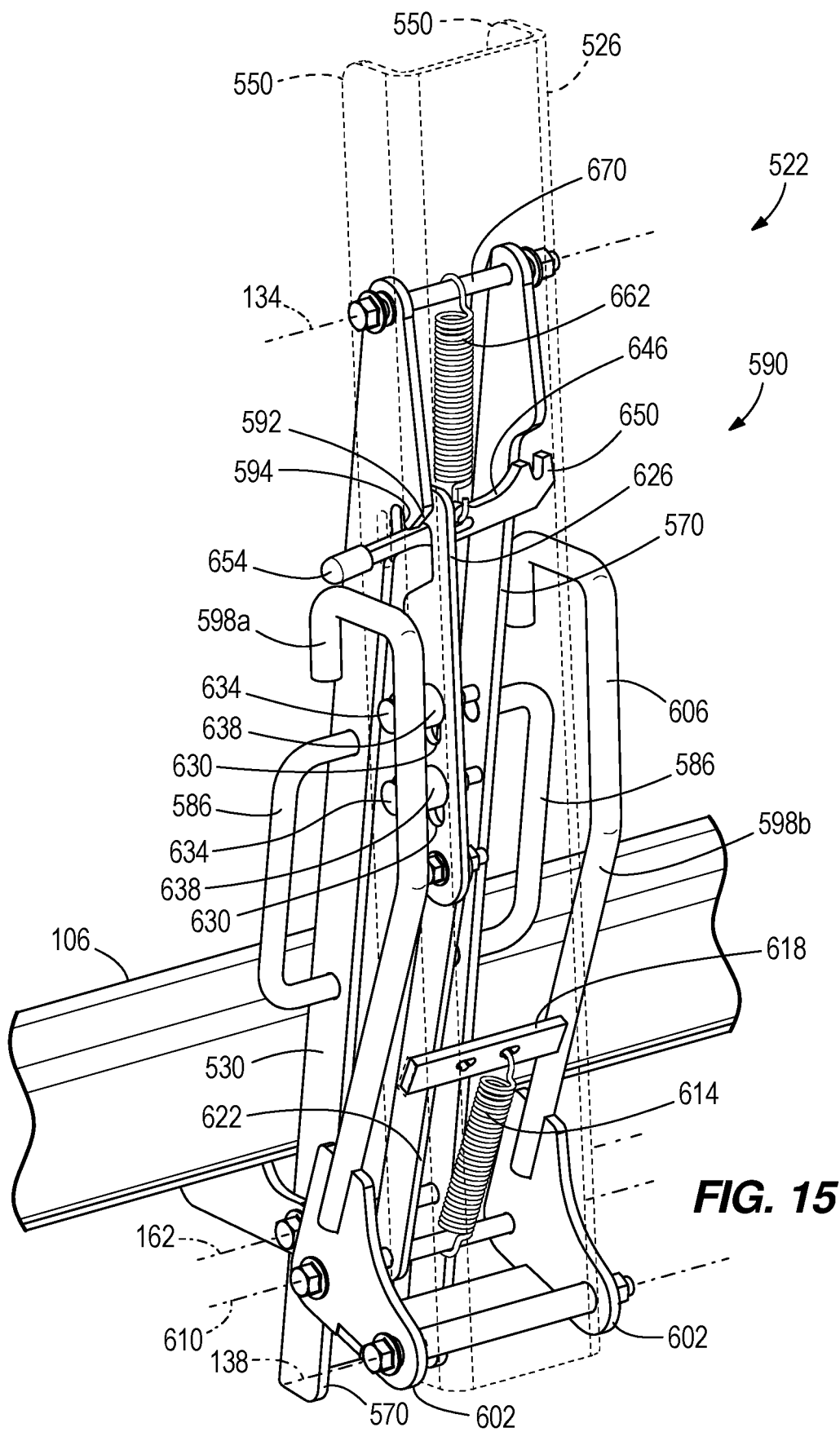
FIG. 15 is a second perspective view of the locking subassembly of FIG. 11 in the unlocked configuration.

As illustrated in FIGS. 14 and 15, the locking subassembly 590 is in an unlocked configuration so that the second extendable carriage 98 is released from the retracted position and can move into the extended position (FIG. 3). The unlocked configuration is defined by the latch 646 being disengaged or spaced from the hook 594 of the second linkage member 530. In the unlocked configuration, the second linkage member 530 is able to rotate relative to the first linkage member 526 about the first pivot axis 134. Stated another way, a distance between the second and third pivot axes 138, 162 is able to increase or decrease when the locking subassembly 590 is in the unlocked configuration. In the illustrated embodiment, the locking subassembly 590 includes two methods of moving from the locked configuration (FIGS. 12 and 13) to the unlocked configuration (FIGS. 14 and 15). The first method includes utilizing manual movement of the latch 646 by an operator. In particular, the operator contacts and moves the second end portion 654 of the latch 646 away from the first pivot axis 134 (e.g., against the biasing force of the second spring 662) so that the latch 646 pivots away from the hook 594 to be positioned between the hook 594 and the second pivot axis 138. The second linkage member 530 can then pivot relative to the first linkage member 526. Once the locking subassembly 590 is in the unlocked configuration, the operator can manually move the second extendable carriage 98 into the extended position.

Furthermore, as the operator pivots the latch 646 away from the first pivot axis 134, the latch 646 linearly moves the linkage actuator 626 toward the second pivot axis 138. The movement of the linkage actuator 626 also moves the linkage arm 622 downwardly so that the linkage arm 622 pushes on the bolt 610 to rotate the bases 602 and the arms 598 about the second pivot axis 138 (e.g., the arms 598 rotate toward the top surface 542 of the first linkage member 526). Accordingly, manual movement of the latch 646 into the unlocked configuration by the operator also moves the arms 598. In other embodiments, movement of the latch 646 by the operator does not also move the linkage actuator 626 and thus does not also move the arms 598.

Figure 16:
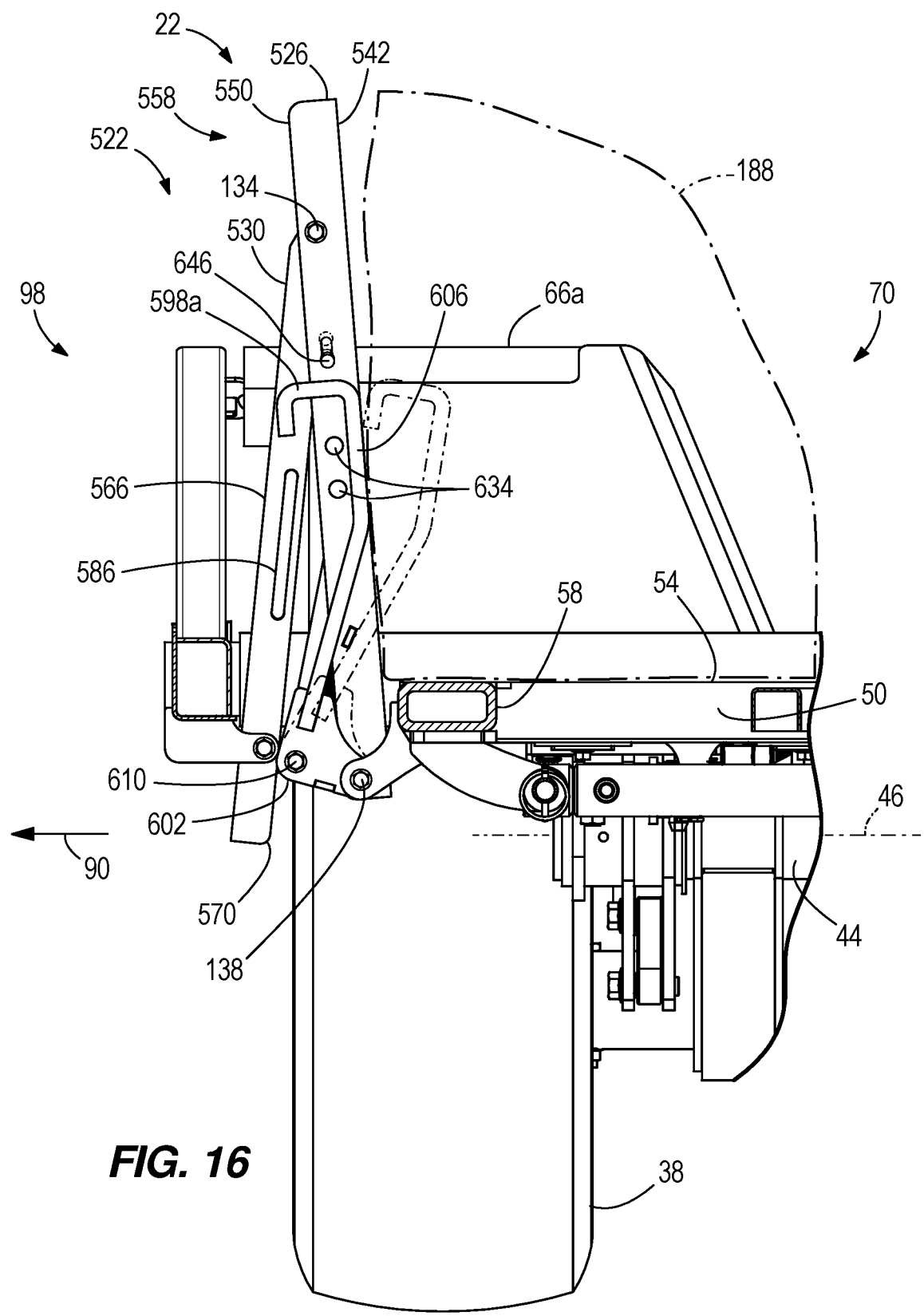
FIG. 16 is a rear view of the accumulator of FIG. 5 including the locking subassembly of FIG. 11 in the locked position with the mechanical linkage and one of the extendable carriages in the retracted position.

With reference to FIGS. 16-19, the second method of moving the locking subassembly 590 from the locked configuration (FIGS. 12 and 13) to the unlocked configuration (FIGS. 14 and 15) includes utilizing the movement of the crop package 188. As previously described, once the crop package 188 exits the baler 18 and is supported on the accumulator frame 42, the bale moving member 82 begins to move the crop package 188 toward the upper carriage member 118 of the second extendable carriage 98. During movement of the crop package 188, a side surface 606 of the crop package 188 contacts the engaging surfaces 606 of the arms 598 to automatically move the locking subassembly 590 into the unlocked configuration. As such, the locking subassembly 590 automatically moves into the unlocked configuration without direct engagement between the locking subassembly 590 and the operator. In particular, as the crop package 188 contacts the arms 598 and moves toward the upper carriage member 118, the arms 598 and the bases 602 rotate about the second pivot axis 138 (FIG. 16). This movement of the arms 598 and the bases 602 also moves the bolt 610 relative to the bracket 618 (e.g., the bolt 610 moves against the biasing force of the first spring 614). In turn, the bolt 610 moves the linkage arm 622 and the linkage arm 622 moves the linkage actuator 626 downwardly toward the second pivot axis 138. Consequently, the finger 642 of the linkage actuator 626 engages and moves the latch 646 out of engagement with the hook 594. Thereafter, the locking subassembly 590 is in the unlocked configuration.

In one embodiment, the locking subassembly 590 may be positioned relative to the bale moving member 82 so that the bale moving member 82 actuates the locking subassembly 590 into the unlocked configuration. For example, an arm extending from the bale moving member 82 in the second direction 90 may directly contact the locking subassembly 590 to move the locking subassembly 590 into the unlocked configuration. In other embodiments, the locking subassembly 590 may be automatically moved into the unlocked configuration by an actuator (e.g., hydraulic, electric, pneumatic, etc.) coupled to the accumulator frame 42, the second extendable carriage 98, and/or the linkage 522.

Figure 17:
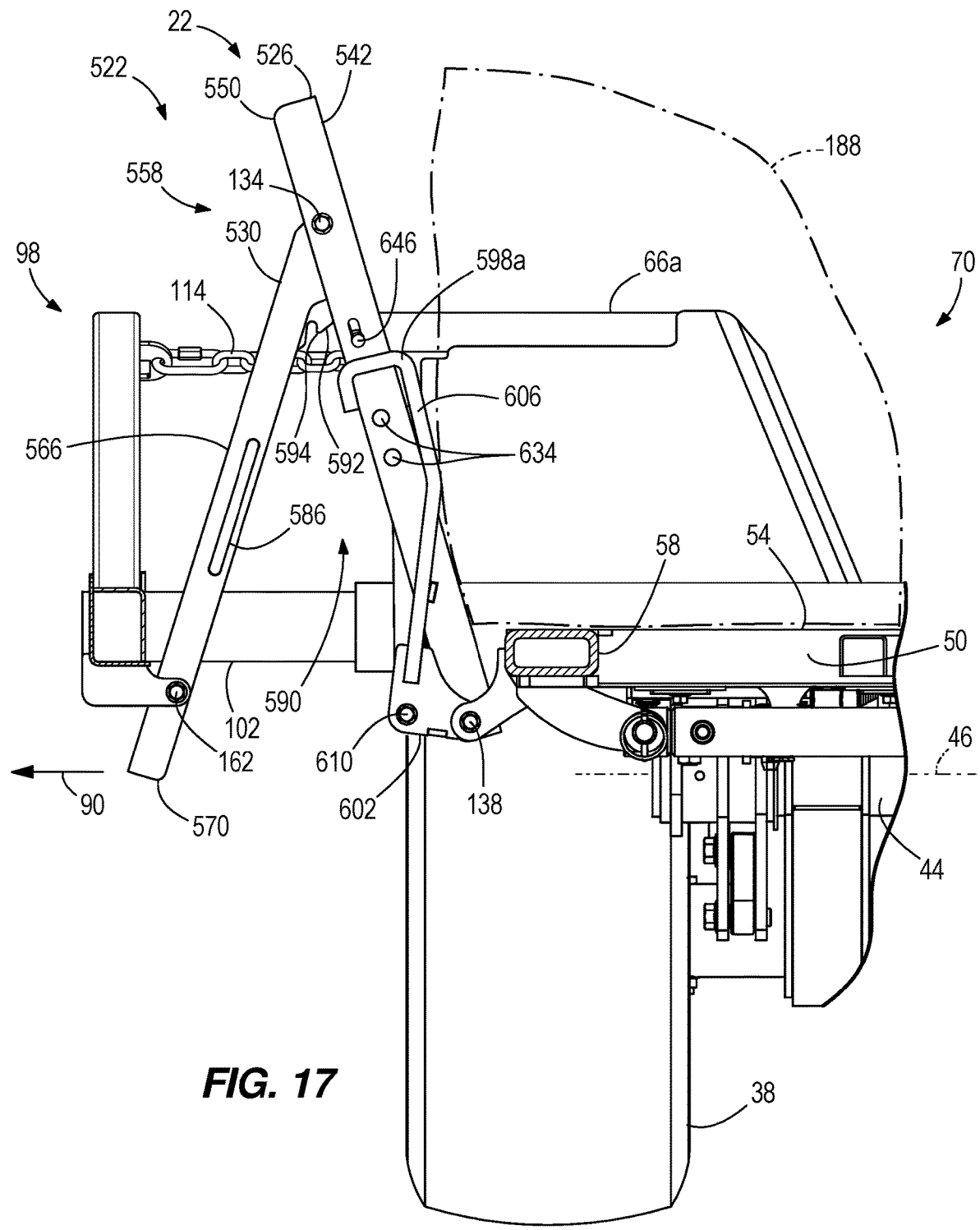
FIG. 17 is a rear view of the accumulator of FIG. 5 including the locking subassembly of FIG. 11 in the unlocked configuration with the mechanical linkage and one of the extendable carriages in a first intermediate position.
Figure 18:
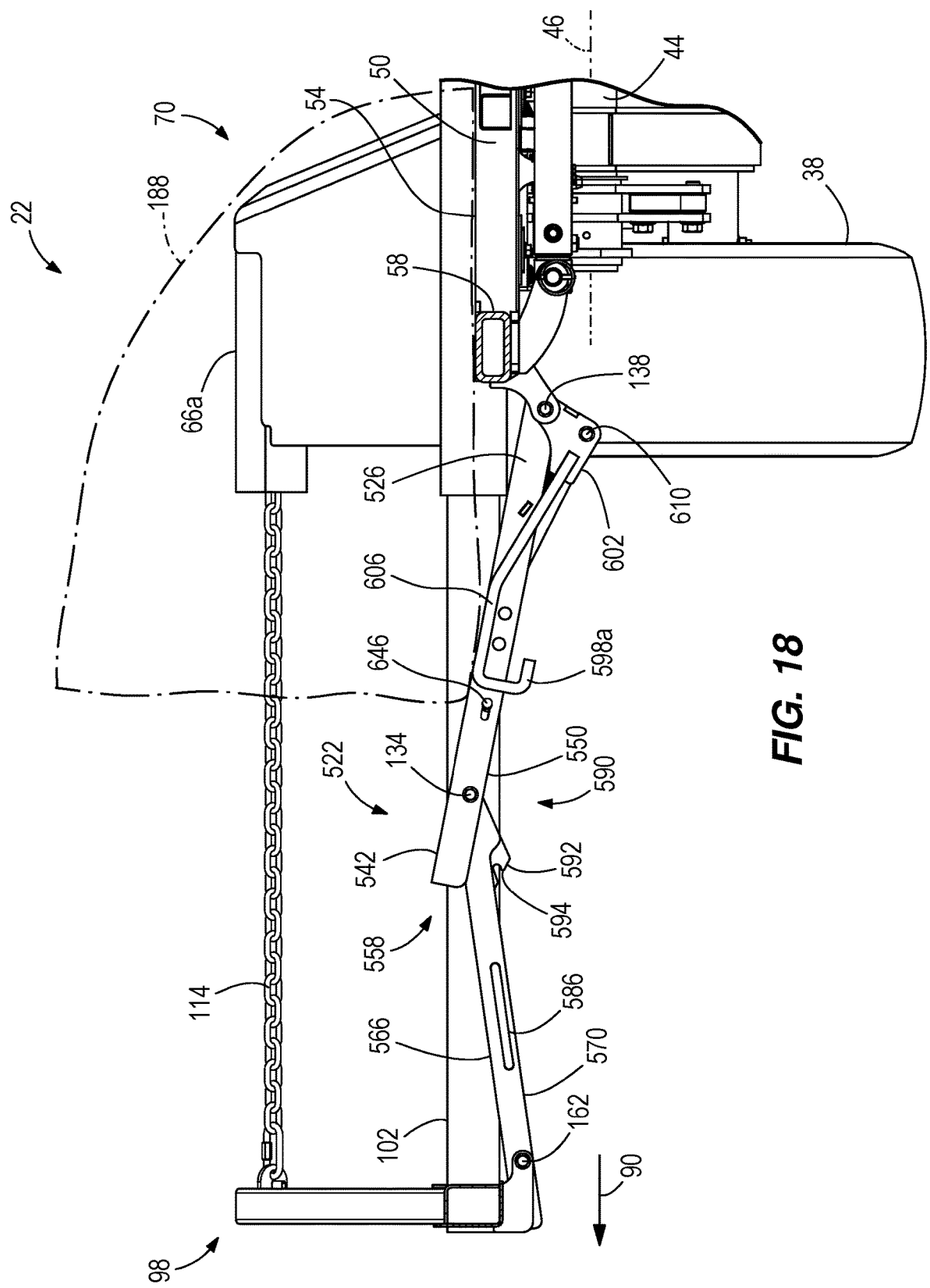
FIG. 18 is a rear view of the accumulator of FIG. 5 including the locking subassembly of FIG. 11 in the unlocked configuration with the mechanical linkage and one of the extendable carriages in a second intermediate position.
Figure 19:
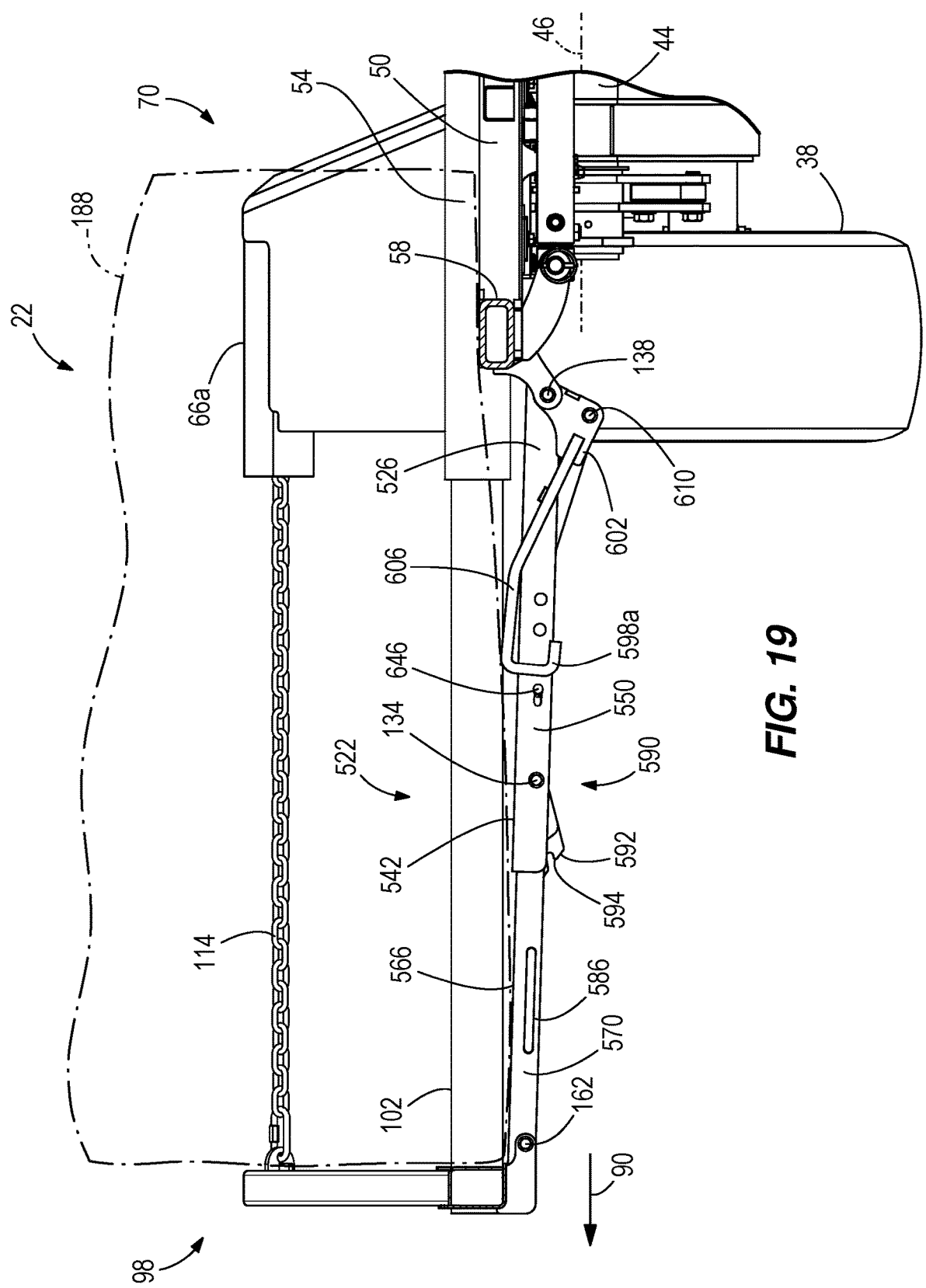
FIG. 19 is a rear view of the accumulator of FIG. 5 including the locking subassembly of FIG. 11 in the unlocked configuration with the mechanical linkage and one of the extendable carriages in the extended position.

After the crop package 188 moves the locking subassembly 590 into the unlocked configuration, the bale moving member 82 continues to move the crop package 188 toward the upper carriage member 118 for the crop package 188 to contact the top surface 542 of the first linkage member 526 (FIG. 17). Further movement of the crop package 188 then pushes on the first linkage member 526 to pivot the first and second linkage members 526, 530 about the second and third pivot axes 138, 162, respectively (FIG. 18). As such, the linkage 522 moves the second extendable carriage 98 into the extended position (FIG. 19) before the crop package 188 is fully supported on the second extendable carriage 98.

After the crop package 188 is dumped from the accumulator 22 as described in the previous embodiment (FIGS. 1-8), the second extendable carriage 98 can be manually moved back into the retracted position (FIG. 2) from the extended position (FIG. 3) by the operator pulling up on the handles 586 of the second linkage member 530 (e.g., pulling the handles 586 toward the upper carriage member 118). The first and second linkage members 526, 530 again pivot about the second and third pivot axes 138, 162, respectively, and fold together for the latch 646 to come in contact with the beveled edge 592 of the second linkage member 530. As the latch 646 contacts the beveled edge 592, the latch 646 slides downwardly along the beveled edge 592 and moves against the biasing force of the second spring 662. With further movement of the second extendable carriage 98 toward the retracted position, the latch 646 clears the beveled edge 592 to be biased back into engagement with the hook 594 by the second spring 662. Thereafter, the second extendable carriage 98 is in the retracted position (FIG. 2) and the locking subassembly 590 is in the locked configuration (FIGS. 12 and 13).

The same operation as described above relative to the second extendable carriage 98 and the locking subassembly 590 also applies to the operation of the first extendable carriage 94.

FIGS. 20-26 illustrate a locking subassembly 790 coupled between the accumulator cart frame 42 and the second extendable carriage 98 according to another embodiment. The locking subassembly 790 is similar to the locking subassembly 590; therefore, like components have been given like reference numbers incremented by 200 and the differences between the locking subassemblies will be discussed in detail. In addition, components or features described with respect to only one or some of the embodiments described herein are equally applicable to any other embodiments described herein.

Figure 20:
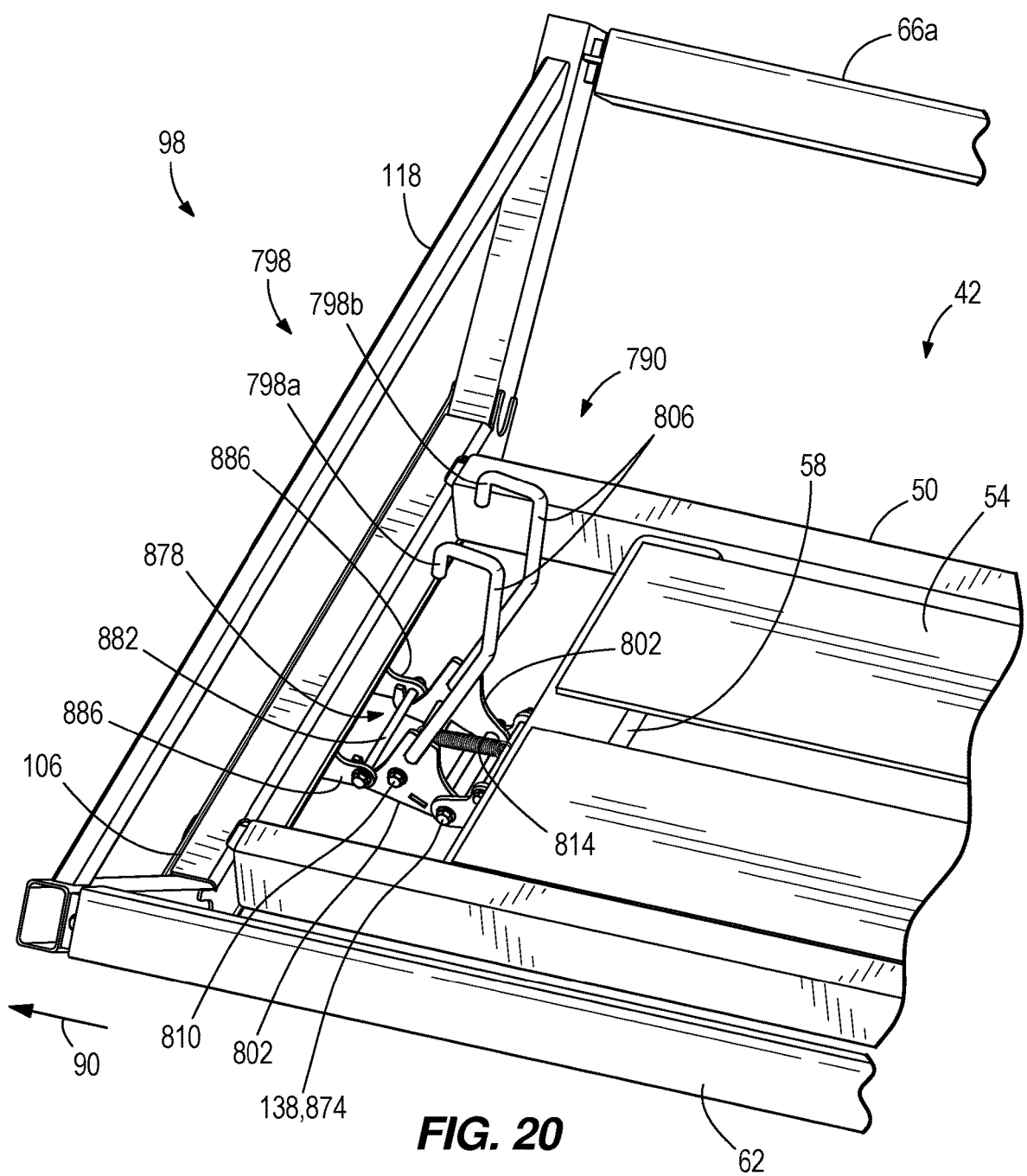
FIG. 20 is a perspective view of a locking subassembly according to another embodiment of the disclosure coupled between the frame of the accumulator and one of the extendable carriages.
Figure 21:
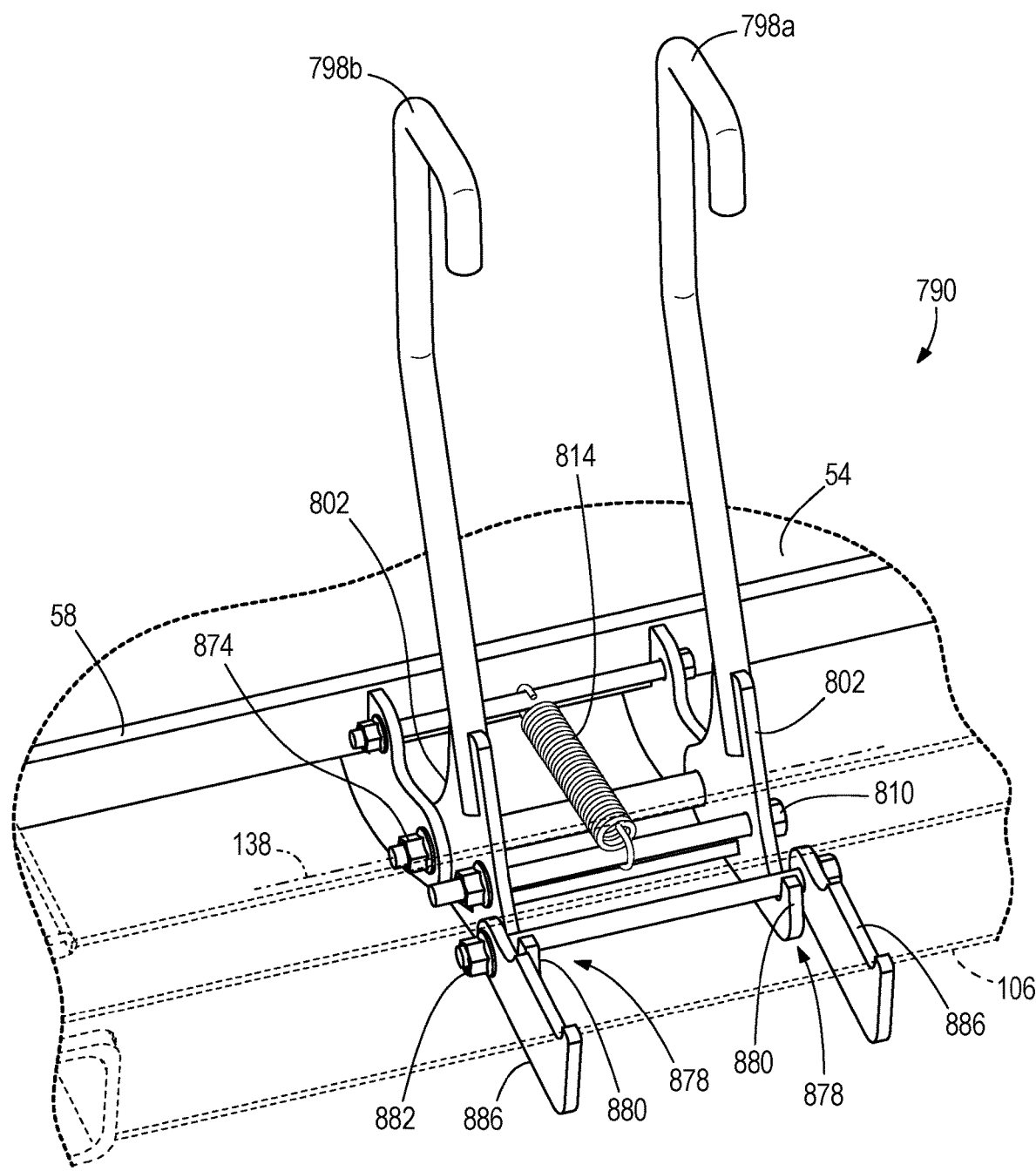
FIG. 21 is a perspective view of the locking subassembly of FIG. 20 in a locked configuration.
Figure 22:
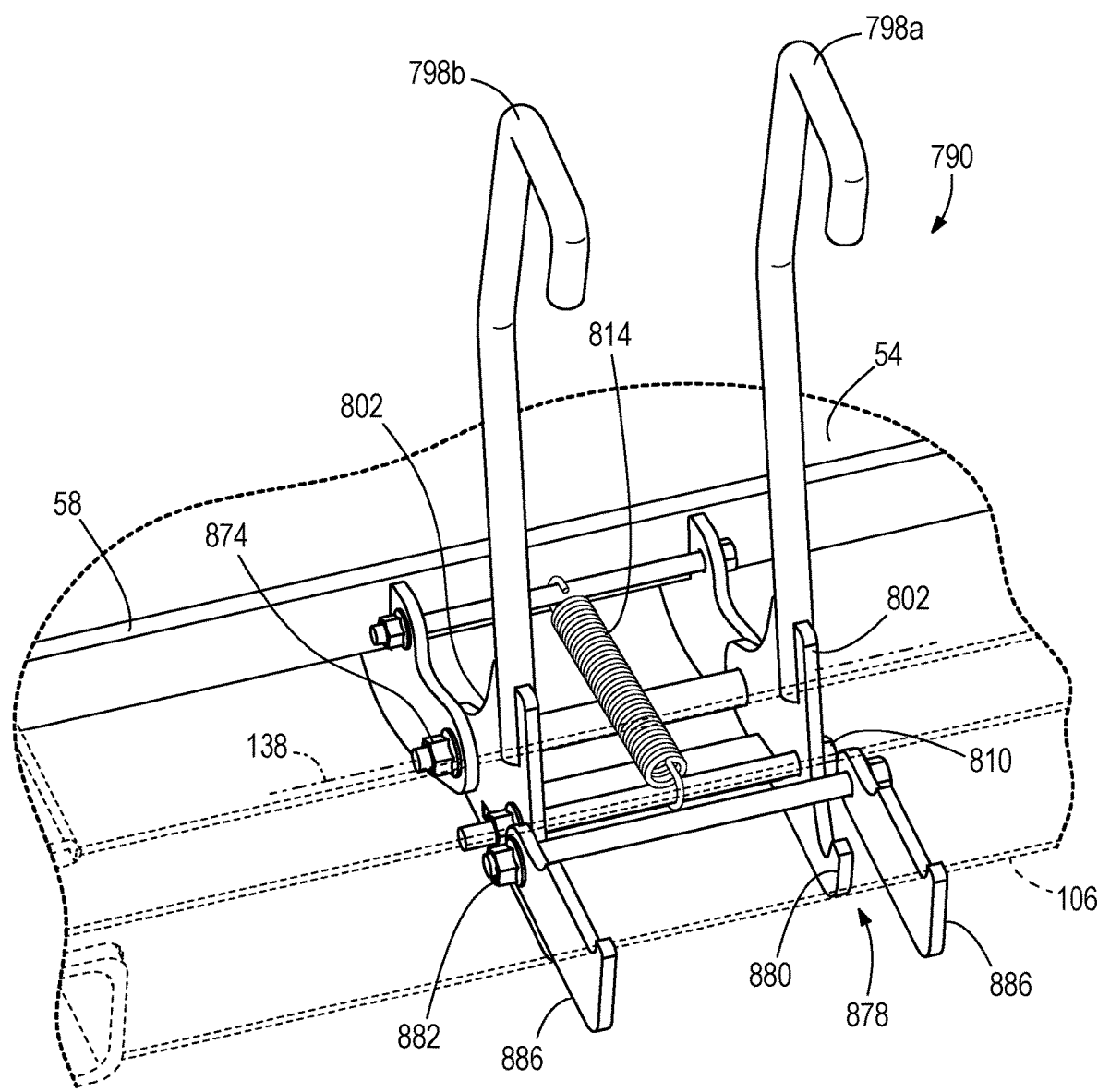
FIG. 22 is a perspective view of the locking subassembly of FIG. 20 in an unlocked configuration.
Figure 23:
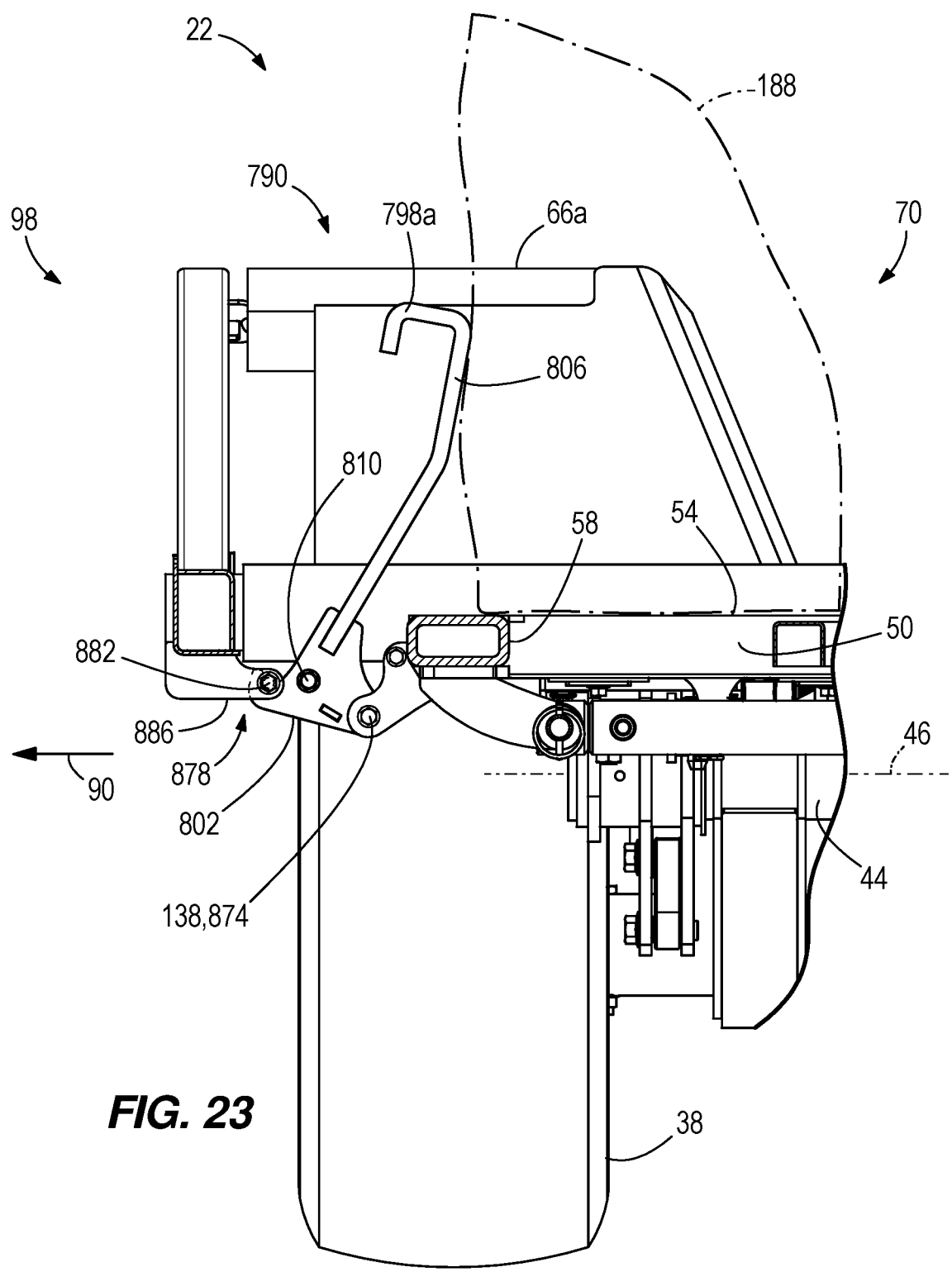
FIG. 23 is a rear view of the accumulator of FIG. 5 including the locking subassembly of FIG. 20 in the locked configuration with one of the extendable carriages in the retracted position.

With reference to FIGS. 20-22, the illustrated locking subassembly 790 includes a pair of arms 798 (i.e., a first arm 798*a* and a second arm 798*b*) fixed to a respective base 802 with each arm 798*a*, 798*b* having an engaging surface 806. The bases 802 are pivotably coupled to the accumulator frame 42 about the second pivot axis 138 so that the arms 798 are also pivotable about the second pivot axis 138. Moreover, a spring 814 is coupled to the accumulator frame 42 at one end and is coupled to a bolt 810 at the other end to bias the bases 802 and the arms 798 about the second pivot axis 138. In other embodiments, the spring 814 may be a torsional spring that is positioned on a first pin 874 that defines the second pivot axis 138. Each illustrated base 802 includes a hook portion 878 and an edge 880. The hook portions 878 are positioned opposite from the first pin 874 so that the hook portions 878 are positioned between the edge 880 and the first pin 874. The hook portions 878 are sized to engage a second pin 882 fixed to the second extendable carriage 98 by support brackets 886. In other embodiments, the hook portion 878 may be sized to directly engage the second extendable carriage 98 (e.g., the carriage cross member 106). In further embodiments, the hook portion 878 may be sized to be received within an aperture formed in the carriage cross member 106.

As illustrated in FIG. 21, the locking subassembly 790 is in a locked configuration to lock the second extendable carriage 98 in the retracted position relative to the accumulator frame 42 (FIG. 20). The locked configuration is defined by the hook portion 878 engaging the second pin 882. Such engagement prevents the second extendable carriage 98 from moving relative to the accumulator frame 42.

As illustrated in FIG. 22, the locking subassembly 790 is in an unlocked configuration so that the second extendable carriage 98 can move into the extended position (FIG. 3). The unlocked configuration is defined by the hook portions 878 being disengaged from the second pin 882.

In the illustrated embodiment, the locking subassembly 790 is moveable from the locked configuration (FIG. 21) to the unlocked configuration (FIG. 22) in two methods. The first method includes utilizing manual movement of the hook portion 878 by an operator. In particular, the operator contacts and moves the arms 798 about the second pivot axis 138 against the biasing force of the spring 814. Consequently, the hook portions 878 disengage from the second pin 882 and the operator can manually move the second extendable carriage 98 into the extended position.

Figure 24:
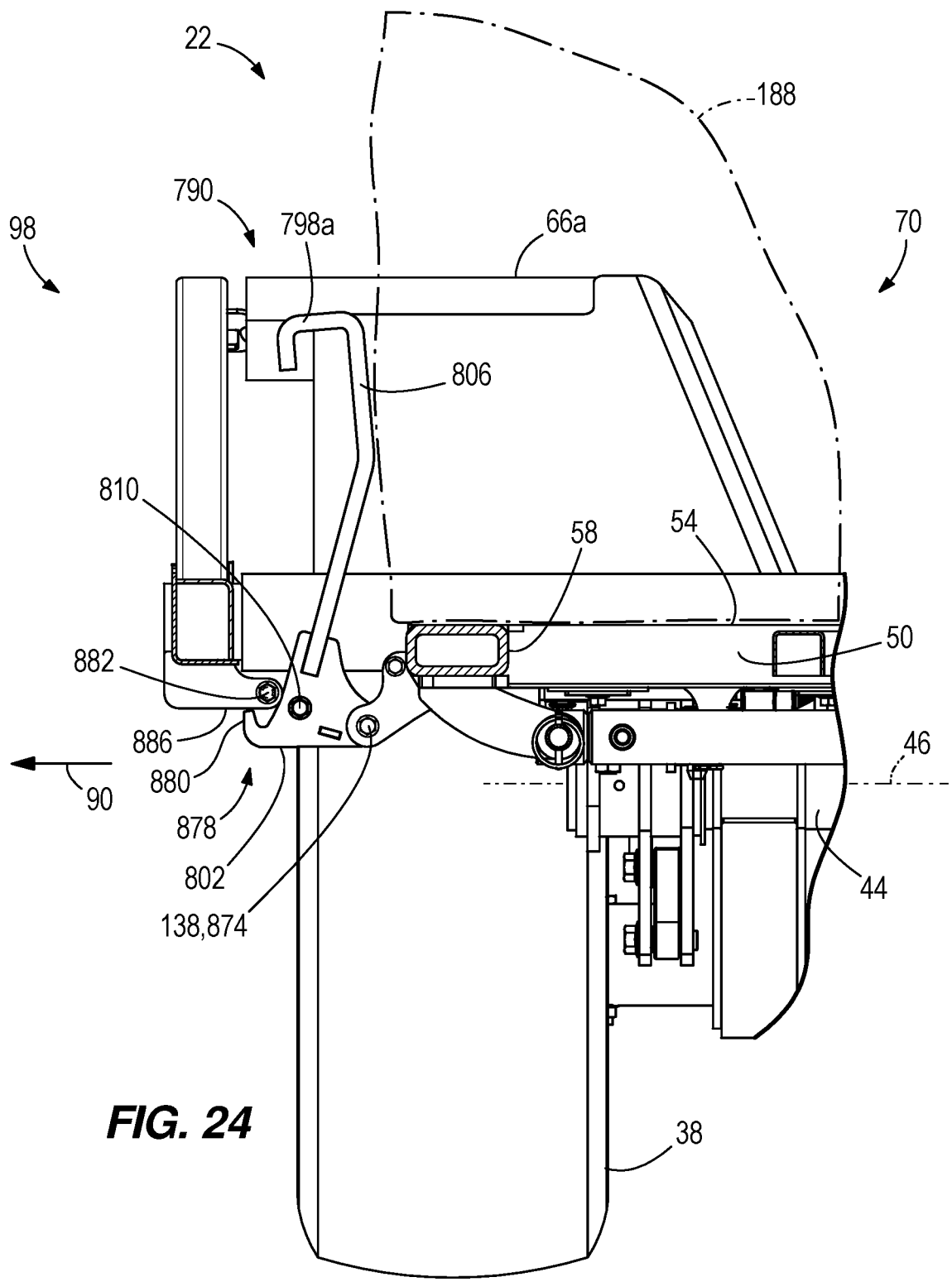
FIG. 24 is a rear view of the accumulator of FIG. 5 including the locking subassembly of FIG. 20 in the unlocked configuration with one of the extendable carriages in the retracted position.

With reference to FIGS. 23-26, the second method of moving the locking subassembly 790 from the locked configuration (FIG. 21) to the unlocked configuration (FIG. 22) includes utilizing the movement of the crop package 188. As previously described, once the crop package 188 exits the baler 18 and is supported on the accumulator frame 42, the bale moving member 82 moves the crop package 188 toward the upper carriage member 118 of the second extendable carriage 98. During movement of the crop package 188, a side surface of the crop package 188 contacts the engaging surfaces 806 of the arms 798 (FIG. 23) to automatically move the locking subassembly 790 into the unlocked configuration. In particular, as the crop package 188 contacts the arms 798 and moves toward the upper carriage member 118, the arms 798 and the bases 802 rotate about the second pivot axis 138 for the hook portions 878 to disengage from the second pin 882 (FIG. 24).

Figure 25:
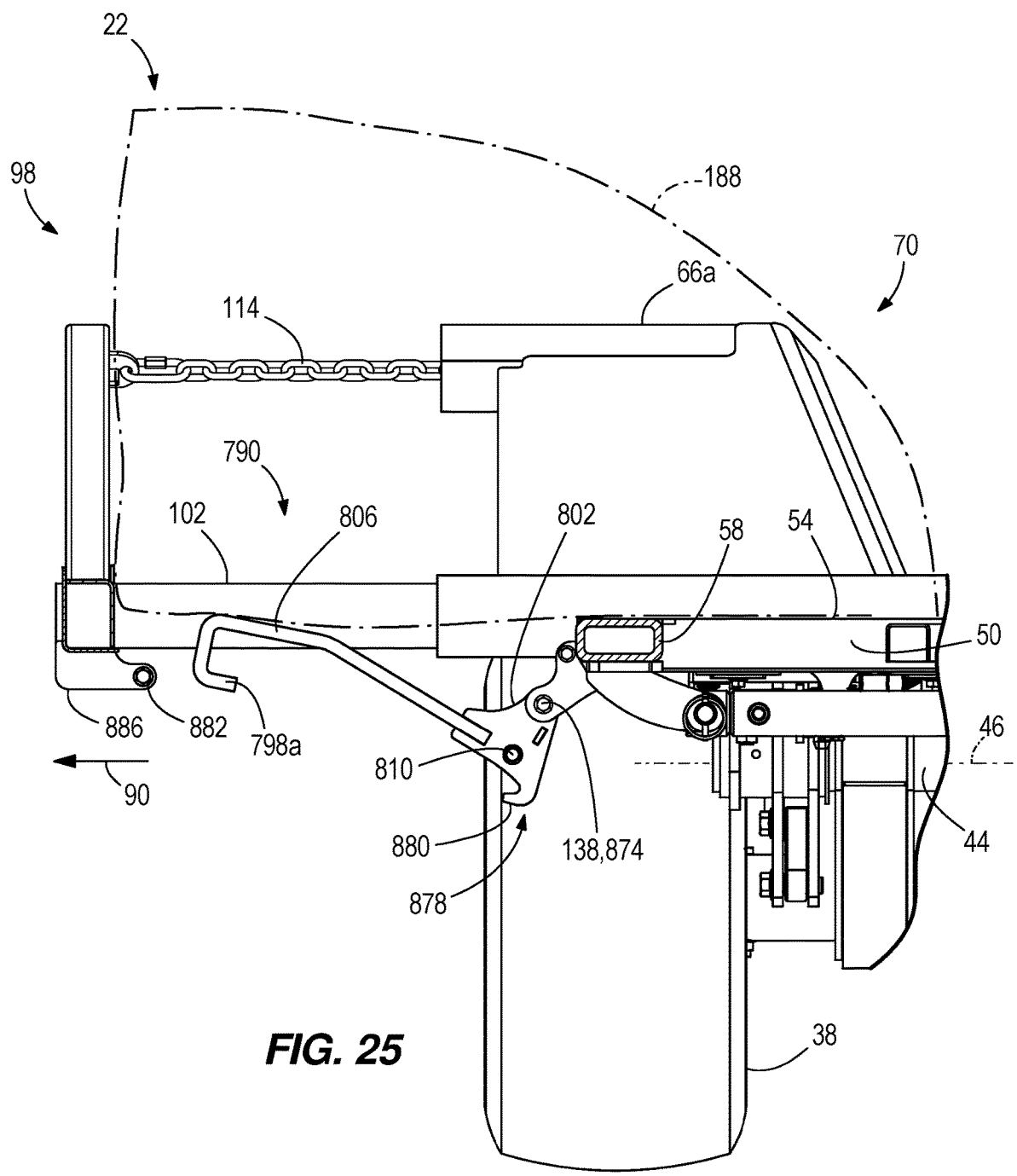
FIG. 25 is a rear view of the accumulator of FIG. 5 including the locking subassembly of FIG. 20 in the unlocked configuration with one of the extendable carriages in an intermediate position.
Figure 26:
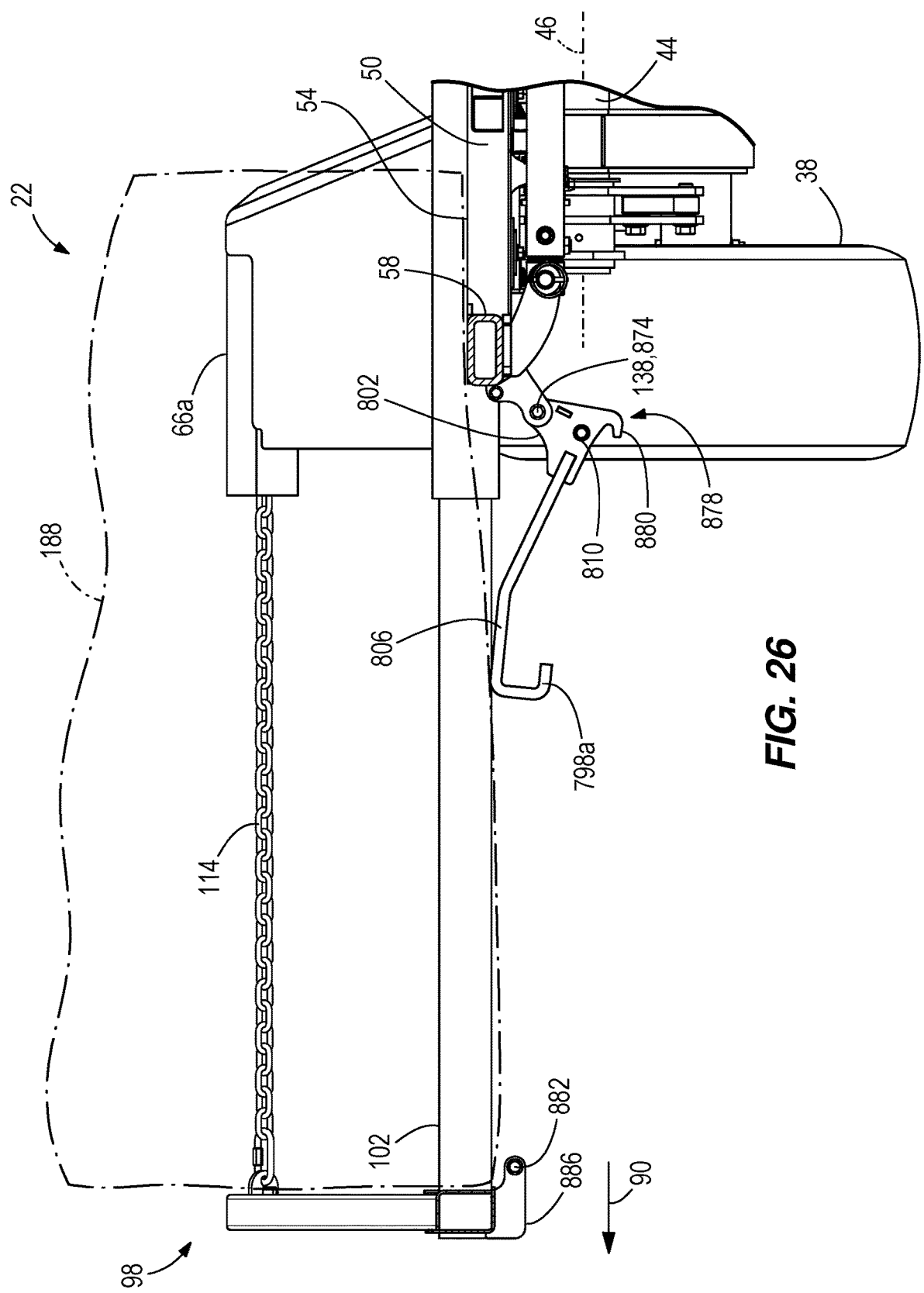
FIG. 26 is a rear view of the accumulator of FIG. 5 including the locking subassembly of FIG. 20 in the unlocked configuration with one of the extendable carriages in the extended position.

After the crop package 188 moves the locking subassembly 790 into the unlocked configuration, the second extendable carriage 98 is allowed to move freely toward the extended position. In the illustrated embodiment, the bale moving member 82 continues to move the crop package 188 in the second direction 90 for the crop package 188 to directly contact a portion of the second extendable carriage 98 (FIG. 25). In particular, the crop package 188 contacts the upper carriage member 118 to move the second extendable carriage 98 into the extended position (FIG. 26). In other embodiments, gravity may act on the second extendable carriage 98 to move the second extendable carriage 98 into the extended position after the locking subassembly 790 is in the unlocked configuration and without the crop package 188 contacting the second extendable carriage 98.

After the crop package 188 is dumped from the accumulator 22 as described in the previous embodiment (FIGS. 1-8), the arms 798 are automatically rotated about the second pivot axis 138 by the spring 814. The operator pushes on a portion of the second extendable carriage 98 toward the accumulator frame 42 to manually move the second extendable carriage 98 toward the retracted position (FIG. 20). As the second extendable carriage 98 slides toward the accumulator frame 42, the second pin 882 moves into engagement with the edge 880 of the bases 802. With further movement of the second extendable carriage 98, the second pin 882 slides along the edge 880 to move the hook portions 878 about the second pivot axis 138 for the second pin 882 to clear the edge 880 and to be reengaged with the hook portions 878. Thereafter, the locking subassembly 790 is again positioned in the locked configuration (FIG. 22).

In further embodiments, the locking subassembly 790 may be used in combination with a mechanical linkage (e.g., the first and second linkage members 126, 130).

The same operation as described above relative to the second extendable carriage 98 and the locking subassembly 790 also applies to the operation of the first extendable carriage 94.

The invention claimed is:

1. An accumulator coupled to an agricultural baler, the accumulator configured to support a crop package exiting the baler, the accumulator comprising:
   a frame including a first end, a second end, and a support surface positioned between the first and the second ends, the support surface configured to support the crop package that exits the baler;
   a carriage coupled to the first end of the frame and linearly moveable relative to the frame between a retracted position and an extended position, the carriage configured to support the crop package when in the extended position; and
   a linkage coupled to at least one of the frame and the carriage, the linkage configured to move the carriage to at least one of the extended and retracted positions,
   wherein a crop package moving member is positioned between the first and second ends of the frame, and wherein the crop package moving member is configured to move the crop package into engagement with the linkage to move the carriage into the extended position.

2. The accumulator of claim 1, wherein the linkage is configured to at least partially support the crop package when the carriage is in the extended position.

3. The accumulator of claim 1, wherein the linkage is pivotably coupled to at least one of the frame and the carriage.

4. The accumulator of claim 1, wherein the linkage is configured to secure the carriage in the extended position in response to the carriage moving into the extended position.

5. The accumulator of claim 1, wherein the linkage includes a first linkage member pivotably coupled to a second linkage member about a first pivot axis, and wherein the first linkage member is pivotably coupled to the frame about a second pivot axis and the second linkage member is pivotably coupled to the first carriage about a third pivot axis.

6. The accumulator of claim 5, wherein the linkage is an over-center linkage having a first state in which the carriage is moveable relative to the frame and a second state in which a relative orientation of the first and second linkage members causes the carriage to be secured in the extended position relative to the frame.

7. The accumulator of claim 6, wherein rotational movement of the first and second linkages provides a mechanical advantage to move the carriage between the extended position and the retracted position.

8. The accumulator of claim 1, wherein the linkage includes a locking subassembly configured to be positioned in a locked configuration so that the locking subassembly is configured to lock the carriage in the retracted position, wherein the locking subassembly is also configured to be positioned in an unlocked configuration so that the locking subassembly is configured to allow movement of the carriage into the extended position.

9. An accumulator coupled to an agricultural baler, the accumulator configured to support a crop package exiting the baler, the accumulator comprising:
a frame including a first end, a second end, and a support surface positioned between the first and the second ends, the support surface configured to support the crop package that exits the baler;
a carriage coupled to the first end of the frame and moveable relative to the frame between a retracted position and an extended position, the carriage configured to support the crop package when in the extended position; and
a linkage coupled to at least one of the frame and the carriage, the linkage configured to move the carriage to the extended position, the linkage configured to retain the carriage in the retracted position.

10. The accumulator of claim 9, further comprising a crop package moving member positioned between the first and second ends of the frame, wherein the crop package moving member is configured to move the crop package into engagement with the linkage to release the carriage from the retracted position.

11. The accumulator of claim 10, wherein the crop package moving member is configured to move the crop package into engagement with the linkage to move the carriage into the extended position after the crop package engages the linkage.

12. The accumulator of claim 9, wherein the linkage includes a first linkage member pivotably coupled to a second linkage member about a first pivot axis, and wherein the first linkage member is pivotably coupled to the frame about a second pivot axis and the second linkage member is pivotably coupled to the first carriage about a third pivot axis.

13. The accumulator of claim 9, wherein the linkage includes a locking subassembly configured to be positioned in a locked configuration so that the locking subassembly is configured to lock the carriage in the retracted position, wherein the locking subassembly is also configured to be positioned in an unlocked configuration so that the locking subassembly is configured to allow movement of the carriage into the extended position.

14. The accumulator of claim 13, wherein the locking subassembly is biased into the locked configuration from the unlocked configuration and is manually actuated from the locked configuration to the unlocked configuration.

15. The accumulator of claim 13, wherein the locking subassembly is automatically actuated from the locked configuration to the unlocked configuration in response to the crop package moving into engagement with a portion of the linkage or the locking subassembly.

16. An accumulator coupled to an agricultural baler, the accumulator configured to support a crop package exiting the baler, the accumulator comprising:
a frame including a first end, a second end, and a support surface positioned between the first and the second ends, the support surface configured to support the crop package that exits the baler;
a carriage coupled to the first end of the frame and moveable relative to the frame between a retracted position and an extended position, the carriage configured to support the crop package when in the extended position; and
a locking subassembly coupled to at least one of the frame and the carriage, the locking subassembly configured to selectively lock the carriage in the retracted position;
wherein the locking subassembly is configured to automatically unlock the carriage from the retracted position such that the carriage is moveable into the extended position.

17. The accumulator of claim 16, further comprising a crop package moving member positioned between the first and second ends of the frame, wherein the crop package moving member is configured to move the crop package into engagement with the locking subassembly to unlock the carriage from the retracted position.

18. The accumulator of claim 16, wherein the locking subassembly includes a hook portion configured to be positioned in a locked configuration so that the hook portion is coupled to the carriage to lock the carriage in the retracted position, wherein the hook portion is also configured to be positioned in an unlocked configuration so that the hook portion is decoupled from the carriage to allow movement of the carriage into the extended position.

19. The accumulator of claim 18, wherein the locking subassembly is biased into the locked configuration from the unlocked configuration and is manually actuated from the locked configuration to the unlocked configuration.

20. The accumulator of claim 18, wherein the locking subassembly is automatically actuated from the locked configuration to the unlocked configuration in response to the crop package moving into engagement with a portion of the locking subassembly.

21. The accumulator of claim 9, wherein the linkage is pivotably coupled to at least one of the frame and the carriage.

* * * * *